United States Patent
Hiraoka et al.

(10) Patent No.: US 10,829,631 B2
(45) Date of Patent: Nov. 10, 2020

(54) COMPOSITION, ACCOMMODATING UNIT, IMAGE FORMING DEVICE, AND IMAGE FORMING METHOD

(71) Applicants: Takao Hiraoka, Kanagawa (JP); Mitsunobu Morita, Shizuoka (JP); Takashi Okada, Kanagawa (JP); Soh Noguchi, Kanagawa (JP); Tatsuki Yamaguchi, Kanagawa (JP); Masahide Kobayashi, Kanagawa (JP); Takenori Suenaga, Kanagawa (JP)

(72) Inventors: Takao Hiraoka, Kanagawa (JP); Mitsunobu Morita, Shizuoka (JP); Takashi Okada, Kanagawa (JP); Soh Noguchi, Kanagawa (JP); Tatsuki Yamaguchi, Kanagawa (JP); Masahide Kobayashi, Kanagawa (JP); Takenori Suenaga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/458,464

(22) Filed: Jul. 1, 2019

(65) Prior Publication Data
US 2020/0010662 A1 Jan. 9, 2020

(30) Foreign Application Priority Data

Jul. 9, 2018 (JP) .................. 2018-129668

(51) Int. Cl.
| | | |
|---|---|---|
| *C08F 2/46* | (2006.01) | |
| *C08F 2/50* | (2006.01) | |
| *C08G 61/04* | (2006.01) | |
| *C08L 33/26* | (2006.01) | |
| *C08K 5/00* | (2006.01) | |
| *C09D 11/38* | (2014.01) | |
| *C08K 5/3462* | (2006.01) | |
| *B41J 11/00* | (2006.01) | |

(52) U.S. Cl.
CPC ............. *C08L 33/26* (2013.01); *B41J 11/002* (2013.01); *C08K 5/0025* (2013.01); *C08K 5/3462* (2013.01); *C09D 11/38* (2013.01)

(58) Field of Classification Search
CPC ........ C08L 33/26; B41J 11/002; C09D 11/38; C08K 5/0025; C08K 5/3462
USPC ................. 522/36, 33, 6, 189, 184, 1; 520/1
See application file for complete search history.

(56) References Cited

U.S. PATENT DOCUMENTS

| | | | |
|---|---|---|---|
| 2014/0363634 A1 | 12/2014 | Morita et al. | |
| 2016/0090504 A1* | 3/2016 | Araki | C09D 167/00 428/201 |
| 2016/0200923 A1* | 7/2016 | Loccufier | B41J 11/00 428/195.1 |
| 2017/0135909 A1* | 5/2017 | Takei | A61K 6/887 |
| 2017/0183519 A1 | 6/2017 | Morita et al. | |
| 2017/0253680 A1 | 9/2017 | Yamada | |
| 2017/0327705 A1 | 11/2017 | Yamada | |
| 2018/0127607 A1* | 5/2018 | Morita | C09D 11/30 |
| 2019/0023924 A1* | 1/2019 | Yamada | B41J 2/17 |
| 2020/0031969 A1* | 1/2020 | Kobayashi | C08F 220/58 |
| 2020/0032068 A1* | 1/2020 | Yamaguchi | B33Y 30/00 |
| 2020/0032089 A1* | 1/2020 | Kobayashi | C09D 11/38 |
| 2020/0038310 A1* | 2/2020 | Suenaga | A61K 8/8158 |

FOREIGN PATENT DOCUMENTS

| | | |
|---|---|---|
| JP | 3-215463 | 9/1991 |
| JP | 2004-182808 | 7/2004 |
| JP | 2006-257350 | 9/2006 |
| JP | 2013-202937 | 10/2013 |
| JP | 2015-013980 | 1/2015 |
| JP | 2018-090679 | 6/2018 |
| WO | WO2013/161298 A1 | 10/2013 |
| WO | WO-2016199589 A1 * 12/2016 | ................ B41J 2/01 |

\* cited by examiner

*Primary Examiner* — Jessica Whiteley
(74) *Attorney, Agent, or Firm* — Oblon, McClelland, Maier & Neustadt, L.L.P.

(57) ABSTRACT

A composition contains an acrylamide compound A1 having an ester structure and a polymerization initiator B1 having a molecular weight of 800 or more.

15 Claims, 8 Drawing Sheets

COMPOSITION, ACCOMMODATING UNIT, IMAGE FORMING DEVICE, AND IMAGE FORMING METHOD

CROSS-REFERENCE TO RELATED APPLICATIONS

This patent application is based on and claims priority pursuant to 35 U.S.C. § 119 to Japanese Patent Application No. 2018-129668, filed on Jul. 9, 2018, respectively, in the Japan Patent Office, the entire disclosure of which is hereby incorporated by reference herein.

BACKGROUND

Technical Field

The present invention relates to a composition, an accommodating unit, an image forming device, and an image forming method.

Description of the Related Art

Radically polymerizable inks and cationically polymerizable inks are known as the ink for use in the active energy ray curable type inkjet recording method. Of these, the radically polymerizable ink is widely used in terms of the production cost and storage stability of the ink.

An ink containing a polymerizable monomer such as an acrylic acid ester and a polymerization initiator that produces a radical upon irradiation with active energy rays is known as the radically polymerizable ink of active energy ray curable type.

For example, an acrylamide compound has been proposed as the polymerizable monomer.

SUMMARY

According to embodiments of the present disclosure, provided is a composition which contains an acrylamide compound A1 having an ester structure and a polymerization initiator B1 having a molecular weight of 800 or more.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
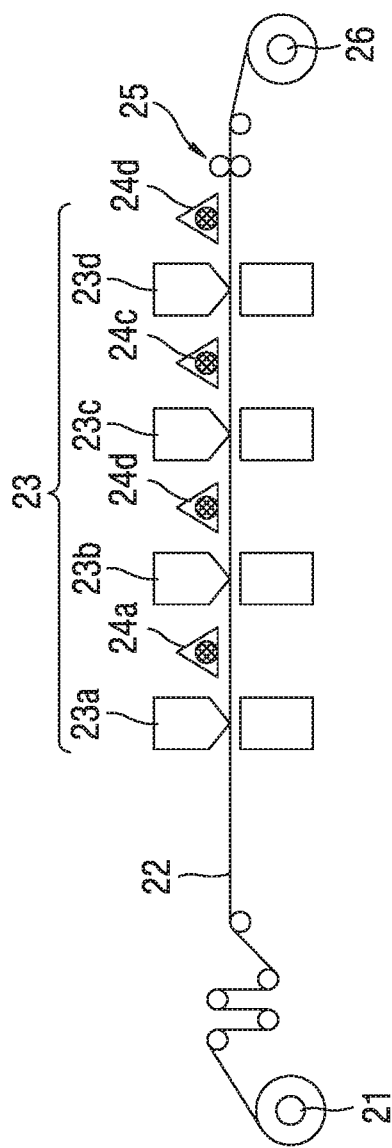
FIG. 1 is a schematic diagram illustrating an example of an image forming device including an inkjet discharging device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

A method of curing an ultraviolet ray curable ink using an ultraviolet ray emitting diode having an emission peak wavelength of 395 nm has been proposed.

Moreover, a polymerization initiator is available on the market which has absorption sensitivity with respect to the wavelength of an ultraviolet ray light emitting diode having a light emission peak wavelength of 365 nm, 385 nm, 395 nm, and 405 nm.

Moreover, usage of an epoxy adhesive has been proposed in the assembly of an ink discharging head for discharging an active energy ray curable ink.

Furthermore, a photopolymerizable inkjet ink using a (meth)acrylic acid ester compound has been proposed.

According to the present disclosure, a composition is provided which demonstrates excellent curability when irradiated with active energy rays, is safe regarding skin sensitization, and demonstrates excellent wet surface property with an adhesive for use in an ink discharging head.

Note that being safe about skin sensitization means that the SI value which indicates the degree of sensitization in the skin sensitization test according to the LLNA method.

The LLNA method is the skin sensitization test defined as OECD test guideline. As shown in "Function and Materials" (published in September, 2005, Vol. 25, No. 9, P55), if the Stimulation Index (SI value) is less than 3, it is determined that no skin sensitization problem occurs.

Next, embodiments of the present disclosure are described.

Composition

The composition of the present disclosure contains an acrylamide compound A1 having an ester structure and a polymerization initiator B1 having a molecular weight of 800 or more, and other optional components such as a polymerizable compound A2 other than the polymerizable acrylamide compound A1, a polymerization initiator B2 having a molecular weight of 800 or more other than the polymerization initiator B1, a coloring material, and an organic solvent.

As the composition of the present disclosure, a curable composition is preferable. As the curable composition, a thermocurable composition, an active energy ray curable composition, etc., can be used. The active energy ray curable composition is more suitable.

However, most of monomers for use in typical photopolymerizable inkjet ink are toxic. In particular, (meth)acrylic acid ester compounds, which are inexpensive and easily available, usually have high toxicity about skin sensitization indicating the degree of allergy upon contact with the skin. So far, this problem has not been solved.

The present inventors have found several (meth)acrylic acid ester compounds and (meth)acrylamide compounds which have no problem in skin sensitization in the previous studies. However, when an ink having a practical level of curability is prepared using these, the ink becomes too viscous. As a result, it is difficult to obtain stable inkjet discharging properties.

On the other hand, striking a balance between lowering the viscosity of a photopolymerizable inkjet ink and improving the curability thereof is a difficult task. It is possible to mix an organic solvent to solve this problem as a solution. However, the usage of an organic solvent causes a problem of deterioration of discharging stability due to thickening of ink ascribable to volatilization and an environmental problem due to the release of volatile organic compounds (VOCs) into the atmosphere. Therefore, it is desirable to avoid using an organic solvent.

The composition of the present disclosure was made based on the knowledge that although a plurality of examples of acrylic acid ester compounds having no problem with skin sensitization have been proposed, no example in which the viscosity can be reduced to a practically usable level as an inkjet ink has been proposed, so that a use of a material having a problem with skin sensitization is inevitable to lower the viscosity.

Acrylamide Compound A1

The acrylamide compound A1 has an acrylamide group and an ester structure and is a polymerizable monomer in an active energy ray curable composition.

An acrylamide group demonstrates polymerizability and means a group in which an acryloyl group ($CH_2$=CH—CO—) is bonded to the nitrogen atom in an amine compound.

Note that, a (meth)acrylic acid ester means an acrylic acid ester or a methacrylic acid ester, and a (meth)acrylate means an acrylate or a methacrylate.

The synthesis method of the acrylamide compound A1 is not particularly limited. For example, it is possible to react a compound having an activated acryloyl group such as acrylic acid chloride or acrylic anhydride with an amine compound to obtain the acrylamide compound A1. As an amine compound which can be used when synthesizing the acrylamide compound A1, any of a primary amine or a secondary amine may be used. However, a secondary amine is preferable taking it into account that no hydrogen bond between amide groups is produced and a tertiary amide is obtained which is advantageous to lower the viscosity.

The ester structure of the acrylamide compound A1 is preferably a linear or branched alkyl ester group having 1 to 4 carbon atoms. As the linear or branched alkyl ester group having 1 to 4 carbon atoms, specific examples include, but are not limited to, methyl group, ethyl group, propyl group, isopropyl group, butyl group, sec-butyl group, isobutyl group, tert-butyl group, etc.

The acrylamide compound A1 is preferably a compound represented by at least one of the following Chemical formula 2 and Chemical formula 3, more preferably a compound represented by one of the following Chemical formula 2 and Chemical formula 3, and furthermore preferably a compound represented by the following Chemical formula 2.

$$CH_2=CH—CO—N(R^1)—R^2—CO—O—R^3 \quad \text{Chemical formula 2}$$

In Chemical formula 2, $R^1$ represents a hydrogen atom or a linear or branched alkyl group having 1 to 4 carbon atoms, $R^2$ represents a linear or branched alkylene group having 1 to 4 carbon atoms, and $R^3$ represents a linear or branched alkyl group having 1 to 4 carbon atoms. The number of the carbon atoms of $R^1$, $R^2$, and $R^3$ is 2 to 6 in total.

In Chemical formula 2, $R^1$ represents a hydrogen atom or a linear or branched alkyl group having 1 to 4 carbon atoms and preferably a linear or branched alkyl group having 1 to 4 carbon atoms.

Specific examples of $R^1$ include, but are not limited to, methyl group, ethyl group, propyl group, isopropyl group, butyl group, sec-butyl group, isobutyl group, and tert-butyl group.

In Chemical formula 2, $R^2$ represents a linear or branched alkylene group having 1 to 4 carbon atoms. Specific examples of $R^2$ include, but are not limited to, methylene group, ethane-1,1-diyl group, ethane-1,2-diyl group, propane-1,1-diyl group, propane-1,2-diyl group, propane-1,3- diyl group, butane-1,1-diyl group, butane-1,2-diyl group, butane-1,3-diyl group, butane-1,4-diyl group, 2-methylpropane-1,1-diyl group, 2-methylpropane-1,2-diyl group, and 2-methylpropane-1,3-diyl group.

In Chemical formula 2, $R^3$ represents a linear or branched alkyl group having 1 to 4 carbon atoms and preferably an alkyl group having 1 to 2 carbon atoms.

Specific examples of $R^3$ include, but are not limited to, methyl group, ethyl group, propyl group, isopropyl group, butyl group, sec-butyl group, isobutyl group, and tert-butyl group.

The number of the carbon atoms of $R^1$, $R^2$, and $R^3$ is 2 to 6 in total.

Chemical formula 3

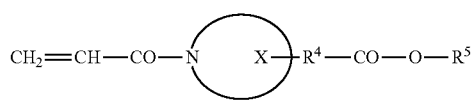

In Chemical formula 3, a ring X represents a ring structure having 2 to 5 carbon atoms including a nitrogen atom. $R^4$ represents a single bond or a linear or branched alkylene group having 1 to 3 carbon atoms, $R^5$ represents a linear or branched alkyl group having 1 to 3 carbon atoms. The number of the carbon atoms of the ring X, $R^4$, and $R^5$ is 3 to 6 in total.

In Chemical formula 3, the ring X represents a ring structure having 2 to 5 carbon atoms containing a nitrogen atom.

Specific examples of the ring X include, but are not limited to aziridine, azetidine, pyrrolidine, and piperidine. Pyrrolidine and piperidine are preferable.

In Chemical formula 3, $R^4$ represents a single bond or a linear or branched alkylene group having 1 to 3 carbon atoms.

Specific example of $R^4$ include, but are not limited to, a single bond, a methylene group, an ethane-1,1-diyl group, an ethane-1,2-diyl group, a propane-1,1-diyl group, a propane-1,2-diyl group, and a propane-1-3-diyl group.

In Chemical formula 3, $R^5$ represents a linear or branched alkyl group having 1 to 3 carbon atoms. Specific examples of $R_5$ includes, but are not limited to, a methyl group, an ethyl group, a propyl group, and an isopopyl group.

The number of the carbon atoms of the ring X, $R^4$, and $R^5$ is 3 to 6 in total.

Examples of the compound represented by Chemical formula 2 or 3 include, but are not limited to, N-acryloyl-N-alkyl amino acid alkyl ester (including N-acryloyl proline alkyl ester), and N-acryloyl piperidine carboxylic acid alkyl ester. The alkyl group referred to in this paragraph means a linear or branched alkyl group having 1 to 4 carbon atoms and particularly preferably an alkyl group having 1 or 2 carbon atoms (that is, a methyl group or an ethyl group).

The N-acryloyl-N-alkyl amino acid alkyl ester is not particularly limited and can be suitably selected to suit to a particular application.

Specific examples include, but are not limited to, N-acryloyl-N-methylglycine methyl ester, N-acryloyl-N-methylglycine ethyl ester, N-acryloyl-N-methylglycine propyl ester. N-acryloyl-N-methylglycine butyl ester, N-acryloyl-N-ethylglycine methyl ester, N-acryloyl-N-ethylglycine ethyl ester, N-acryloyl-N-ethylglycine propyl ester, N-acryloyl-N-propylglycine methyl ester, N-acryloyl-N-propylglycine ethyl ester, N-acryloyl-N-butylglycine methyl ester, N-acryloyl-N-methylalanine methyl ester, N-acryloyl-N-methylalanine ethyl ester, N-acryloyl-N-methylalanine propyl ester, N-acryloyl-N-ethylalanine methyl ester, N-acryloyl-N-ethylalanine ethyl ester, N-acryloyl-N-propylalanine methyl ester, N-acryloyl-N-methyl-β-alanine methyl ester, N-acryloyl-N-methyl-β-alanine ethyl ester, N-acryloyl-N-ethyl-β-alanine methyl ester, N-acryloyl-N-ethyl-β-alanine ethyl ester, N-acryloyl-N-methyl valine methyl ester, N-acryloyl-proline methyl ester, and N-acryloyl-proline ethyl ester. These can be used alone or in combination.

The N-acryloyl piperidine carboxylic acid alkyl ester is not particularly limited and can be suitably selected to suit to a particular application.

Specific examples include, but are not limited to, N-acryloyl piperidine-2-carboxylic acid methyl ester, N-acryloyl piperidine-3-carboxylic acid methyl ester, and N-acryloyl piperidine-4-carboxylic acid methyl ester. These can be used alone or in combination.

A specific example of the compound represented by Chemical formula 2 or 3 other than N-acryloyl-N-alkyl amino acid alkyl ester and N-acryloyl piperidine carboxylic acid alkyl ester is methacryloyloxy ethyl acryl amide but is not limited thereto.

Moreover, the acrylamide compound A1 represented by Chemical formula 2 or 3 is preferable because skin sensitization ascribable to the polymerizable monomer contained in the composition of the present disclosure can be reduced.

The molecular weight of the acrylamide compound A1 is preferably from 150 to 250 and more preferably from 150 to 200. When the molecular weight is 150 or more, the odor ascribable to volatilization of the compound can be reduced and inkjet discharging stability can be improved, which is preferable. When the molecular weight is 250 or less, curability of the composition is excellent, the strength of the cured product is improved, and moreover viscosity of the composition does not increase, which is preferable.

In application to the inkjet recording method, the acrylamide compound A1 is preferably a colorless transparent or pale yellow transparent liquid having a low viscosity (100 mPa·s or less) at normal temperature (25 degrees C.). In addition, for the safety of a user, it is preferable not to demonstrate strong acidity or basicity or not to contain a harmful formaldehyde as an impurity. Furthermore, it is preferable to uniformly dissolve the polymerization initiator B1 represented by Chemical formula 1 used in combination with the acrylamide compound A1 to have a suitable polarity which contributes to property improvement of a cured product. In addition, for this reason, the molecular weight is preferably from 150 to 250.

Although a large number of acrylamide compounds having an acrylamide group demonstrating a polymerizability and containing no ester structure (e.g., N-acryloyl morpholine, N, N-dimethyl acrylamide, N,N-diethyl acrylamide, N-isopropyl acrylamide, N-(2-hydroxyethyl)acrylamide, N-(hydroxymethyl)acrylamide, N-(butoxymethyl)acrylamide, N-[3-(dimethylamino)propyl]acrylamide, N-(1,1-dimethyl-3-oxobutyl)acrylamide, and 2-acrylamido-2-methylpropane sulfonic acid) are commercially available, it is difficult to find a compound satisfying all the effects of the present disclosure. The present inventors have found that the effect of the present disclosure is satisfied by the acrylamide compound A1 containing an ester structure having an appropriate neutral polarity.

The proportion of the content of the acrylamide compound A1 to the total content of the composition is preferably from 39.8 to 95.8 percent by mass, more preferably from 50 to 95.8 percent by mass, and furthermore preferably from 59.8 to 94.8 percent by mass. To improve the liquid contact of an adhesive used in the assembly of an ink discharging head with the composition, the proportion of the acrylamide compound A1 is preferably 39.8 percent by mass or more. Moreover, to ameliorate curability of the composition upon application of active energy rays, the proportion of the acrylamide compound A1 is preferably 95.8 percent by mass or less. The acrylamide compound A1 can be used alone or in combination.

Polymerization Initiator B1 Having Molecular Weight of 800 or More

The polymerization initiator B1 having a molecular weight of 800 or more is not particularly limited and can be suitably selected to suit to a particular application. It is preferable to select at least one member from the group consisting of the polymerization initiator represented by the following Chemical formula 1, 1,3-di({α-[1-chloro-9-oxo-9H-thioxanthen-4-yl)oxy]acetyl poly[oxy(1-methylethylene)]}oxy)-2,2-bis({α-[1-chloro-9-oxo-9H-thioxanthen-4-yl)oxy]acetyl poly[oxy(1-methylethylene)]}oxymethyl) propane (Speedcure 7010, manufactured by Lambson Group Ltd.), a mixture (Speedcure 7040, manufactured by Lambson Group Ltd.) of 1,3-di({α-4-(dimethylamino)benzoyl-poly[oxy(1-methylethylene)]}oxy)-2,2-bis({α-4-(dimethylamino)benzoyl poly[oxy(1-methylethylene)]}oxymethyl) propane and {α-4-(dimethylamino)benzoylpoly(oxyethylene)-poly[oxy(1-methylethylene)]-poly(oxyethylene)}4-(dimethylamino)benzoate.polybutylene glycol bis(9-oxo-9H-thioxanthinyloxy)acetate (Omnipol TX, manufactured by IGM Resins B.V.), polymeric thioxanthene compound (Genepol TX-2, manufactured by Lahn AG), and an oligomer of 2-hydroxy-1-(4-isopropenylphenyl)-2-methylpropan-1-one (Esacure ONE, manufactured by IGM Resins B.V.).

Examples of the polymerization initiator having an absorption sensitivity to these emission peak wavelengths include, but are not limited to, acyl phosphine oxide type polymerization initiators and α-amino ketone type polymerization initiators. However, bis(2,4,6-trimethylbenzoyl)-phenylphosphine oxide (Irgacure 819), etc., known as an acyl phosphine oxide-based polymerization initiator, has poor solubility to the acrylamide compound A1 having an ester structure for use in the composition of the present disclosure. Therefore, it is difficult to obtain curability at practical level when an ultraviolet light emitting diode irradiates an active energy ray curable composition containing a polymerization initiator having poor solubility as described above with ultraviolet rays having a light emission peak in the wavelength range of from 365 to 405 nm.

On the other hand, the polymerization initiator B1 having a molecular weight of 800 or more is well dissolved in the acrylamide compound A1 having an ester structure for use in the composition of the present disclosure. Therefore, when irradiating an active energy ray curable composition containing the acrylamide compound A1 having an ester structure and the polymerization initiator B1 having a molecular weight of 800 or more with ultraviolet rays having an emission peak at a wavelength range of from 365 nm to 405 nm using an ultraviolet emitting diode, practical curability is obtained.

The proportion of the content of the polymerization initiator B1 having a molecular weight of 800 or more to the total content of the composition is preferably from 1 to 20 percent by mass, more preferably from 3 to 15 percent by mass, and furthermore preferably from 5 to 10 percent by mass. In addition, the polymerization initiator B1 having a molecular weight of 800 or more can be used alone or in combination.

Chemical formula 1

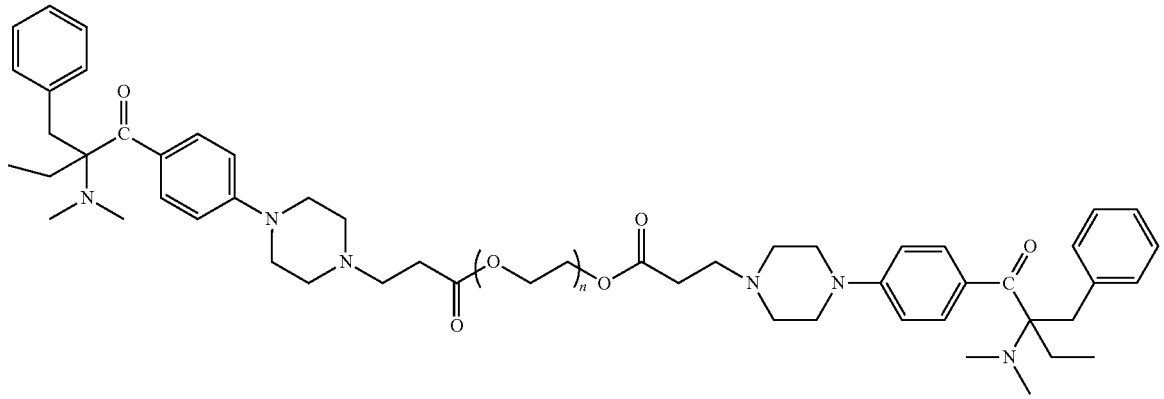

In Chemical formula 1, n represents an integer of from 1 to 9.

A specific example of the polymerization initiator represented by Chemical formula 1 illustrated above is polyethylene glycol 200-di(β-4(4-(2-dimethylamino-2-benzyl)butanonylphenyl)piperazine) (Omnipol 910, manufactured by IGM Resins B.V.).

In addition, the polymerization initiator is also simply referred to as an initiator.

The polymerization initiator having a molecular weight of 800 or more has an absorption sensitivity to the wavelength of an ultraviolet ray emitting diode having an emission peak wavelength of 365 nm, 385 nm, 395 nm, or 405 nm.

Further, the mass ratio of the content of the acrylamide compound A1 to the content of the polymerization initiator BI having a molecular weight of 800 or more in the composition is preferably from 5.0 to 25.0, more preferably from 8.0 to 20.0, and furthermore preferably from 9.0 to 19.0.

Polymerizable Compound A2 Other than Acrylamide Compound A1

Specific examples of the polymerizable compound A2 other than the acrylamide compound A1 include, but are not limited to, known polymerizable monomers typified by (meth)acrylic acid esters such as methyl(meth)acrylate, ethyl(meth)acrylate, n-butyl(meth)acrylate, allyl(meth)acrylate, glycidyl(meth)acrylate, 2-(dimethylamino)ethyl(meth)acrylate, 2-hydroxyethyl(meth)acrylate, 2-butoxyethyl (meth)acrylate, ethyl carbitol(meth)acrylate, cyclohexyl (meth)acrylate, tetrahydrofurfuryl(meth)acrylate, 2-(2-vinyloxyethoxy)ethyl(meth)acrylate, benzyl(meth)acrylate, 2-phenoxyethyl(meth)acrylate, 2-hydroxy-3-phenoxypropyl (meth)acrylate, isobornyl(meth)acrylate, ethylene glycol di(meth)acrylate, diethylene glycol di(meth)acrylate, triethylene glycol di(meth)acrylate, tetraethylene glycol di(meth) acry late, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, neopentyl glycol di(meth)acrylate, ethoxylated neopentyl glycol di(meth)acrylate, propoxylated neopentyl glycol di(meth)acrylate, 1,6-hexanediol di(meth)acrylate, 1,9-nonanediol di(meth)acrylate, pentaerythritol tri(meth)acrylate, pentaerythritol tetra(meth)acrylate, dipentaerythritol hexa(meth)acrylate, and trimethylolpropane tri(meth)acrylate. These can be used alone or in combination.

Other examples of the polymerizable compound A2 other than the acrylamide compound A1 include, but are not limited to, a urethane (meth)acrylate derivative obtained by reacting a compound having an isocyanate group with a (meth)acrylic acid ester having a hydroxyl group, and an epoxy (meth)acrylate derivative obtained by reacting (meth) acrylic acid with a compound having an epoxy group.

In addition to the derivatives of (meth)acrylic acid derivative, N-vinyl compounds such as N-vinylcaprolactamn N-vinylpyrrolidone, and N-vinylformamide, aromatic vinyl compounds such as styrene and α-methylstyrene, vinyl ethers such as diethylene glycol divinyl ethers, triethylene glycol divinyl ether, and cyclohexane dimethanol divinyl ether, and allyl compounds such as allyl glycidyl ether, diallyl phthalate, and triallyl trimellitate.

In addition, acrylamide compounds which do not have the ester structure can be used as the other polymerizable compound A2.

The proportion of the polymerizable compound A2 other than the acrylamide compound A1 in the total amount of the composition is from 1 to 60 percent by mass and more preferably from 5 to 40 percent by mass. The polymerizable compound A2 other than the acrylamide compound A1 can be used alone or in combination.

Due to the usage of the polymerizable compound A2 other than the acrylamide compound A1, curability and viscosity of the composition and curability and adhesion of the cured product can be easily controlled to suit to a particular application.

Polymerization Initiator B2 Other than Polymerization Initiator B1 Having Molecular Weight of 800 or More As the polymerization initiator B2 other than the polymerization initiator B1 having a molecular weight of 800 or more, known compounds which can promote the polymerization reaction of a polymerizable monomer by irradiation of active energy rays are usable without a particular limitation. In addition, the polymerization initiator B2 other than the polymerization initiator B1 having a molecular weight of 800 or more can be used alone or in combination.

The proportion of the content of the polymerization initiator B2 other than the polymerization initiator B1 having a molecular weight of 800 or more in the total content of the composition is from 0.1 to 10.0 percent by mass and more preferably from 0.5 to 5.0 percent by mass.

Due to the usage of the polymerization initiator B2 other than the polymerization initiator B1 having a molecular weight of 800 or more, curability and viscosity of the composition and curability and adhesion of the cured product can be easily controlled to suit to a particular application.

Coloring Material

The composition of the present disclosure may contain a coloring agent.

As the coloring agent, depending on the objectives and requisites of the composition in the present disclosure, various pigments and dyes can be used, which impart black, white, magenta, cyan, yellow, green, orange, and gloss color such as gold and silver.

The proportion of the content of the coloring agent is not particularly limited and determined considering the desired color density, dispersibility of the coloring agent, etc.

Preferably, the proportion the content of the coloring agent to the total content of the composition is from 0.1 to 20 percent by mass. The composition of the present disclosure does not necessarily include a coloring material but can be clear and colorless.

If the composition does not contain a coloring material, the composition is suitable as an overcoat layer to protect images.

As the pigment, an inorganic or organic pigment can be used alone or in combination.

Specific examples of the inorganic pigment include, but are not limited to, carbon blacks (C.I. Pigment Black 7) such as furnace black, lamp black, acetylene black, and channel black, iron oxides, and titanium oxides.

Specific examples of the organic pigment include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxane pigments, thioindigo pigments, isoindolinone pigments, and quinophthalone pigments, dye chelate such as basic dye type chelate and acid dye type chelate, dye lakes such as basic dye type lake and acidic dye type lake, nitro pigments, nitroso pigments, aniline black, and daylight fluorescent pigments.

In addition, a dispersant is optionally added to enhance dispersibility of a pigment. The dispersant has no particular limit. For example, it is suitable to use a polymer dispersant conventionally used to prepare a pigment dispersion.

The dye includes, for example, an acidic dye, a direct dye, a reactive dye, a basic dye, and a combination thereof.

Organic Solvent

The composition of the present disclosure may include an organic solvent, but if possible, it is preferred that the composition be free of an organic solvent. The composition free of an organic solvent, in particular a volatile organic compound (VOC), is preferable because it enhances safeness at where the composition is handled so that pollution of the environment can be prevented. The organic solvent represents a conventional non-reactive organic solvent, for example, ether, ketone, xylene, ethylacetate, cyclohexanone, and toluene, which is clearly distinguished from reactive monomers. Furthermore, "free of" an organic solvent means that no organic solvent is substantially included. The proportion is preferably less than 0.1 percent by mass.

Other Components

The composition of the present disclosure may furthermore optionally contain other components. The other components are not particularly limited. Examples are known articles such as surfactants, polymerization inhibitors, leveling agents, defoaming agents, fluorescent brighteners, penetration-enhancing agents, wetting agents (humectants), fixing agents, viscosity stabilizers, fungicide, preservatives, antioxidants, ultraviolet absorbents, chelate agents, pH regulator, and thickeners.

Preparation of Composition

The composition of the present disclosure can be prepared by using the components mentioned above. The preparation devices and conditions are not particularly limited.

For example, the curable composition can be prepared by loading a polymerizable monomer, a pigment, a dispersant, etc., into a dispersing machine such as a ball mill, a kitty mill, a disk mill, a pin mill, and a DYNO-MILL to prepare a pigment liquid dispersion followed by mixing with a polymerizable monomer, an initiator, a polymerization inhibitor, and a surfactant.

Viscosity

The viscosity of the composition of the present disclosure has no particular limit and can be adjusted to suit to a particular application and device. For example, if a discharging device that discharges the composition from nozzles is used, the viscosity thereof is preferably in the range of from 3 to 40 mPa·s, more preferably from 5 to 15 mPa·s, and particularly preferably from 6 to 12 mPa·s in the temperature range of from 20 to 65 degrees C., preferably at 25 degrees C. In addition, it is particularly preferable to satisfy this viscosity range without containing the organic solvent mentioned above. Viscosity can be measured by a cone-and-plate type rotary viscometer (VISCOMETER TVE-22L, manufactured by TOKI SANGYO CO., LTD.) using a cone rotor (1°34'×R24) at a rotational frequency of 50 rpm with a setting of the temperature of hemathermal circulating water in a range of from 20 to 65 degrees C. VISCOMATE VM-150III can be used for the temperature control of the circulating water.

Curing Device

The device to cure the composition of the present disclosure utilizes curing upon application of heat or active energy rays. Curing upon application of active energy rays is preferable.

The active energy rays for use in curing the composition of the present disclosure are not particularly limited as long as they can apply energy to conduct polymerization reaction of the polymerizable components in the curable composition.

Specific examples include, but are not limited to, electron beams, $\alpha$ rays, $\beta$ rays, $\gamma$ rays, and X rays, in addition to ultraviolet rays. A particularly high energy light source obviates the need for a polymerization initiator to proceed polymerization reaction. In addition, in the case of irradiation of ultraviolet rays, mercury-free is strongly demanded in terms of protection of environment. Therefore, replacement with GaN-based ultraviolet light-emitting devices is greatly preferred from industrial and environmental point of view. Furthermore, ultraviolet ray light-emitting diode (UV-LED) and ultraviolet ray laser diode (UV-LD) are preferable.

Small size, long working life, high efficiency, and high cost performance thereof make such irradiation sources desirable as an ultraviolet light source.

Of these, ultraviolet ray having a light emission wavelength in a wavelength range of from 365 to 395 nm emitted from an ultraviolet ray emitting diode (hereinafter, also referred to as UV-LED) is preferable and ultraviolet ray having a light emission peak at a wavelength of from 365 to 395 nm is more preferable. Further, ultraviolet rays having an emission peak at a wavelength of 365 nm, 385 nm, or 395 nm is more preferable. From a viewpoint of productivity, the active energy ray curable composition is preferably cured upon irradiation of ultraviolet rays having an emission peak at the irradiation wavelength range of from 365 to 395 nm with a light intensity of 1.0 J/cm$^2$ or less, more preferably 0.5 J/cm$^2$ or less, and furthermore preferably 0.4 J/cm$^2$ or less.

Field of Application

The application field of the composition of the present disclosure is not particularly limited. It can be applied to any field where the active energy ray curable composition is used. For example, the curable composition is selected suit to a particular application and used for a resin for processing, a paint, an adhesive, an insulant, a releasing agent, a coating material, a sealing material, various resists, and various optical materials.

Figure 2:
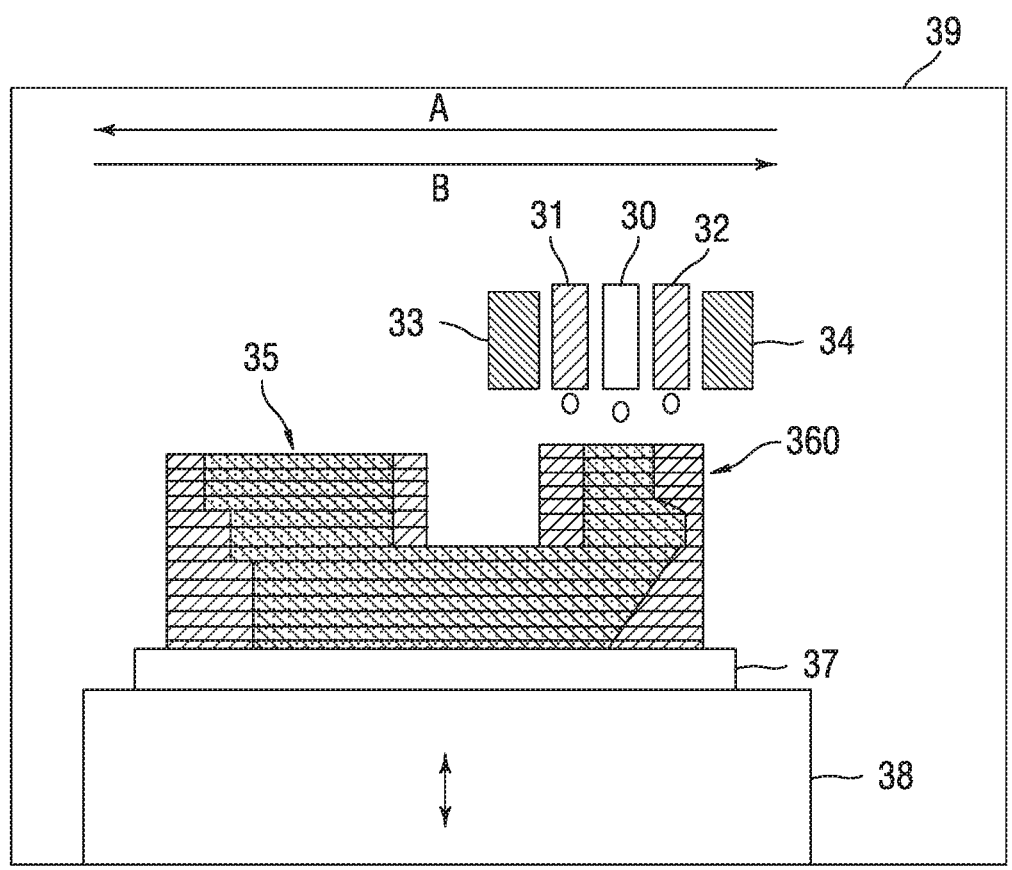
FIG. 2 is a schematic diagram illustrating an example of another image forming device (device for fabricating a three-dimensional image)
Figure 3A:
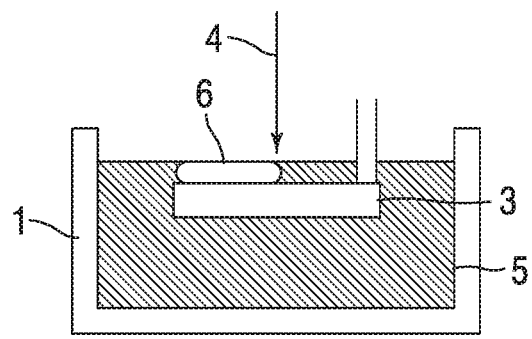
FIGS. 3A to 3D are schematic explanatory diagrams illustrating an example of a method of solid free-form fabrication using an active energy ray curable composition.
Figure 3B:
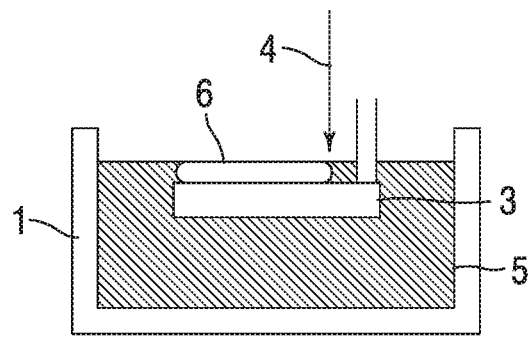
Figure 3C:
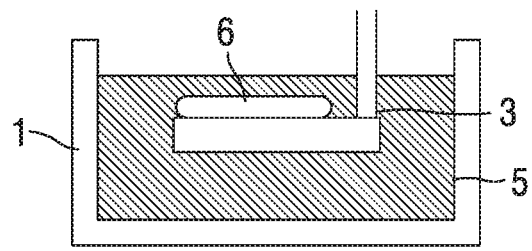
Figure 3D:
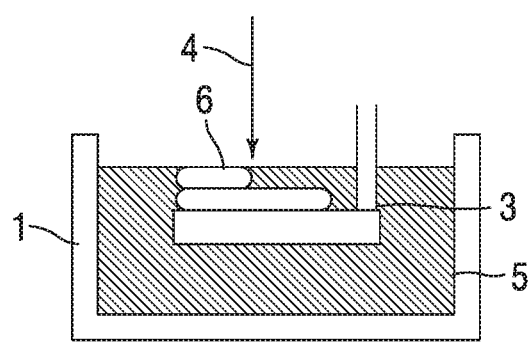

Furthermore, the composition of the present disclosure can be used as an ink to form two-dimensional texts, images, and designed coating film on various substrates and in addition a solid object forming material to form a three-dimensional image (solid freeform fabrication object). This material for a solid freeform fabrication can be used as a binder for powder particles for use in powder additive manufacturing to conduct solid freeform fabrication by repeating curing and laminating powder layers. Also, it can be used as a solid constituting material (modeling material) or supporting member (supporting material) for use in additive manufacturing (stereolithography) method as illustrated in FIG. 2 and FIGS. 3A to 3D. FIG. 2 is a diagram illustrating a method of discharging the composition of the present disclosure to a particular area followed by curing upon irradiation of active energy rays to form a layer and laminating the layers (detail of which is described later).

FIGS. 3A to 3D are diagrams illustrating a method of irradiating a pool (accommodating unit) 1 of the composition 5 of the present disclosure with active energy rays 4 to form a cured layer 6 having a particular form on a movable stage 3 and sequentially laminating the cured layer 6 so that a solid freeform fabrication object is obtained.

As the apparatus for fabricating a three-dimensional (solid) object by the composition of the present disclosure, a known apparatus can be used and is not particularly limited. For example, the apparatus includes a containing device, a supplying device, and a discharging device of the composition, an active energy ray irradiator, etc.

In addition, the present disclosure includes a cured product obtained by causing the composition to cure and processed products obtained by processing structures having the cured product formed on a substrate. For example, the cured product or structures having a sheet-like form or film-like form is subject to molding process such as hot drawing and punching to obtain such a processed product. The molded product is preferably used for, for example, gauges or operation panels of vehicles, office machines, electric and electronic machines, and cameras, which require surface-processing after decorating the surface.

The substrate is not particularly limited. It can be suitably selected to suit to a particular application. Examples are paper, fiber, threads, fabrics, leather, metal, plastic, glass, wood, ceramics, or composite materials thereof. Of these, plastic substrates are preferred in terms of processability.

Accommodating Unit

The accommodating unit of the present disclosure means a container accommodating the composition and is suitable for the applications as described above. For example, if the composition of the present disclosure is used for ink, a container that accommodates the ink can be used as an ink cartridge or an ink bottle. Therefore, users can avoid direct contact with the ink during working such as transfer or replacement of the ink, so that fingers and clothes are prevented from being contaminated. Furthermore, inclusion of foreign matter such as dust in the ink can be prevented. In addition, the container can be of any size, any form, and any material. For example, the container can be designed to a particular application. It is preferable that the container be made of a light blocking material to block the light or covered with a light blocking sheet, etc.

Image Forming Method and Image Forming Device

The image forming method of the present disclosure may utilize active energy rays, heating, etc.

The image forming method of the present disclosure includes at least an irradiating step of irradiating the composition of the present disclosure with an active energy ray to cure the composition. The image forming device of the present disclosure includes an irradiator to irradiate the composition of the present disclosure with an active energy ray and an accommodating unit to accommodate the composition of the present disclosure. The accommodating unit may include the container mentioned above. Furthermore, the method and the device may respectively include a discharging step and a discharging device to discharge the composition. The method of discharging the composition is not particularly limited. Examples are a continuous spraying method and an on-demand method. The on-demand method includes a piezo method, a thermal method, an electrostatic method, etc.

FIG. 1 is a diagram illustrating an image forming device including an inkjet discharging device. Printing units 23a, 23b, 23c, and 23d respectively having ink cartridges and discharging heads for yellow, magenta, cyan, and black active energy ray curable inks discharge the inks onto a recording medium 22 fed from a supplying roll 21. Thereafter, light sources 24a, 24b, 24c, and 24d emit active energy rays to the inks to cure the inks so that a color image is formed. Thereafter, the recording medium 22 is conveyed to a processing unit 25 and a printed matter reeling roll 26. Each of the printing units 23a, 23b, 23c and 23d may include a heating mechanism to liquidize the ink at the ink discharging portion. Moreover, a mechanism may be optionally disposed which cools down the recording medium to an ambient temperature in a contact or non-contact manner. In addition, the inkjet recording method may be either of a serial method of discharging an ink onto a recording medium by moving the head while the recording medium intermittently moves in accordance with the width of a discharging head or a line method of discharging an ink onto a recording medium from a discharging head held at a fixed position while continuously moving the recording medium.

The recording medium 22 is not particularly limited. Specific examples include, but are not limited to, paper, film, ceramics, glass, metal, or complex materials thereof. The recording medium 22 takes a sheet-like form but is not limited thereto. The image forming device may have a simplex printing configuration capable of printing on one side of a recording medium or a duplex printing configuration capable of printing on both sides thereof. The recording medium is not limited to articles used as typical recording media. It is suitable to use corrugated cardboard, building materials such as wall paper and floor material, cloth for apparel such as T-shirts, textile, and leather as the recording media.

Optionally, multiple colors can be printed with no or faint active energy rays from the light sources 24a, 24b, and 24c, followed by irradiation of the active energy rays from the light source 24d. This saves energy and cost.

The recorded matter having images printed with the composition of the present disclosure includes articles having printed images or texts on a plain surface of conventional paper, resin film, etc., articles having printed images or texts on a rough surface, and articles having printed image or texts on a surface made of various materials such as metal or ceramic. In addition, by laminating layers of two-dimensional images in part of a recording medium, a partially stereoscopic image (formed of two dimensional part and three-dimensional part) or a three dimensional object can be fabricated.

FIG. 2 is a schematic diagram illustrating an example of the image forming device (device for fabricating a three-dimensional image) relating to the present disclosure. An image forming device 39 illustrated in FIG. 2 forms laminated layers while discharging a first composition from a discharging head unit 30 for fabrication object and a curable composition composed of different ingredients from the first composition from discharging head units 31 and 32 for a support by using a head unit having inkjet heads arranged movable in the directions indicated by the arrows A and B and curing each composition by ultraviolet irradiators 33 and 34 placed adjacent to the discharging head units 31 and 32. More specifically, for example, after the discharging head units 31 and 32 for a support discharge the second composition onto a substrate 37 for fabrication, the second active energy ray curable composition is solidified upon application of irradiation of active energy rays to form a first support layer having a hollow space (pool) for fabrication, and the discharging head unit 30 for fabrication object discharges the first composition onto the hollow space followed by irradiation of active energy rays for solidification, thereby to form a first fabrication layer. This step is repeated multiple times in accordance with the required number of lamination while moving the stage 38 up and down in the vertical direction to laminate the support layer and the fabrication layer to manufacture a solid freeform fabrication object 35. Thereafter, a laminated support 360 is removed, if desired. Although only a single discharging head unit 30 for fabrication object is disposed in FIG. 2, the device may have two or more discharging head units 30.

Inkjet Discharging Device

The inkjet discharging device (hereinafter also referred to as ink discharging head) includes a liquid chamber, a nozzle plate having a nozzle orifice(s) (hole), and a flow path. Also, the member in contact with the active energy ray curable ink as the composition of the present disclosure is preferably bonded with an adhesive such as an epoxy adhesive. The liquid chamber means a space to be filled with ink in the ink discharging head and is not particularly limited. A known chamber can be suitably selected to suit to a particular application.

The nozzle plate is not particularly limited as long as it has a nozzle hole. A known plate can be suitably selected to suit to a particular application. Through the nozzle hole, ink droplets are discharged.

The active energy ray curable ink passes through the liquid chamber and the nozzle plate on the flow path.

The member in contact with the active energy ray curable ink being bonded by an epoxy adhesive means that any one or more of the members constituting the liquid chamber, the members constituting the nozzle plate, and the members constituting the flow path are bonded at least one portion with the epoxy adhesive. In addition, it is particularly preferable that the joint portions of the nozzle plate and a stimulus generating device, which is described later, and members (for example, a flow path plate and a diaphragm, which are described later) located between these be joined by the epoxy adhesive, and this joint portion be in contact with the active energy ray curable ink.

The member that contacts with the active energy ray curable ink is not particularly limited as long as the active energy ray curable ink comes into contact, and can be suitably selected to suit to a particular application. Examples include, but are not limited to, members constituting a liquid chamber, members constituting a nozzle plate, members constituting the flow path, members constituting the stimulation generating device.

Nozzle Plate

The nozzle plate includes a nozzle substrate and an ink repellent film on the nozzle substrate.

Nozzle Substrate

The nozzle substrate is provided with nozzle holes, and the number, shape, size, material, structure, etc., thereof are not particularly limited and can be suitably selected to suit to a particular application.

The nozzle substrate has a nozzle surface on the ink discharging side from which the ink is discharged through the nozzle holes and a liquid chamber bonding surface located on the opposite side to the surface on the ink discharge side.

The ink repellent film is formed on the nozzle surface on the ink discharging side of the nozzle substrate.

There is no particular limit to the material for the nozzle substrate and it can be suitably selected to suit to a particular application.

Specific examples include, but are not limited to, Al, Bi, Cr, InSn, ITO, Nb, $Nb_2O_5$, NiCr, Si, $SiO_2$, Sn, $Ta_2O_5$, Ti, W, $ZAO(ZnO+Al_2O_3)$, and Zn. These can be used alone or in combination. Of these, stainless steel is preferable in terms of rust prevention.

Ink Repellent Film

The ink repellent film is formed on the nozzle surface on the ink discharging side having a plurality of concave portions in the nozzle substrate, and the shape, structure, material, thickness, etc., thereof are not particularly limited, and can be suitably selected to suit to a particular application.

There is no particular limit to the material of the ink repellent film and it can be suitably selected to suit to a particular application. For example, a silicone resin and a perfluoropolyether compound are suitable in terms of repellency to the ink.

Liquid Chamber

The liquid chamber is formed of a plurality of individual flow paths which are individually disposed corresponding to the plurality of nozzle holes provided on the nozzle plate and are in communication with the nozzle holes. The liquid chamber is also referred to as a pressurized liquid chamber, a pressure chamber, a discharging chamber, and a pressurizing chamber.

Other Members

The other members are not particularly limited and can be suitably selected to suit to a particular application. An example is a stimulus generating device.

Stimulus Generating Device

The stimulus generating device generates a stimulus applied to the ink.

Examples of the stimulus generating device include, but are not limited to, a heater, a pressurizing device, a piezoelectric element, a vibrator, an ultrasonic oscillator, and light.

Specific examples include, but are not limited to, a piezoelectric actuator such as the piezoelectric element, a thermal actuator that utilizes a phase change caused by film boiling of ink using an electric heat conversion element such as a heat generating resistance, a shape-memory alloy actuator that uses the metal phase change due to temperature change, and an electrostatic actuator that utilizes an electrostatic force.

Figure 4:
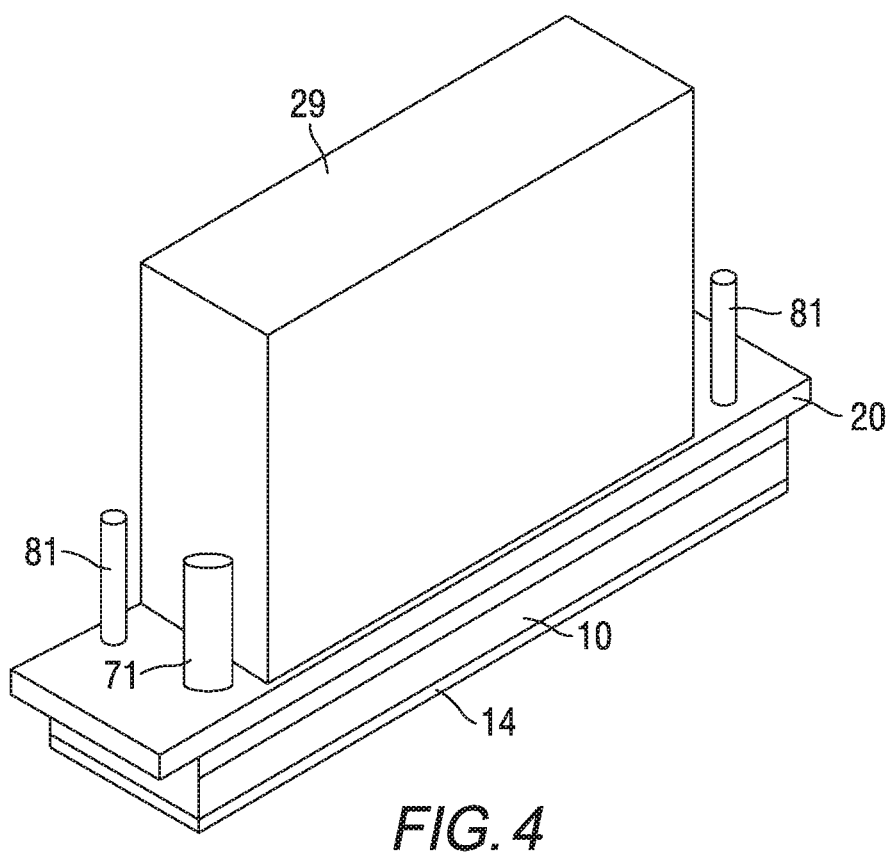
FIG. 4 is a diagram illustrating a perspective view of an example of an ink discharging head.
Figure 5:
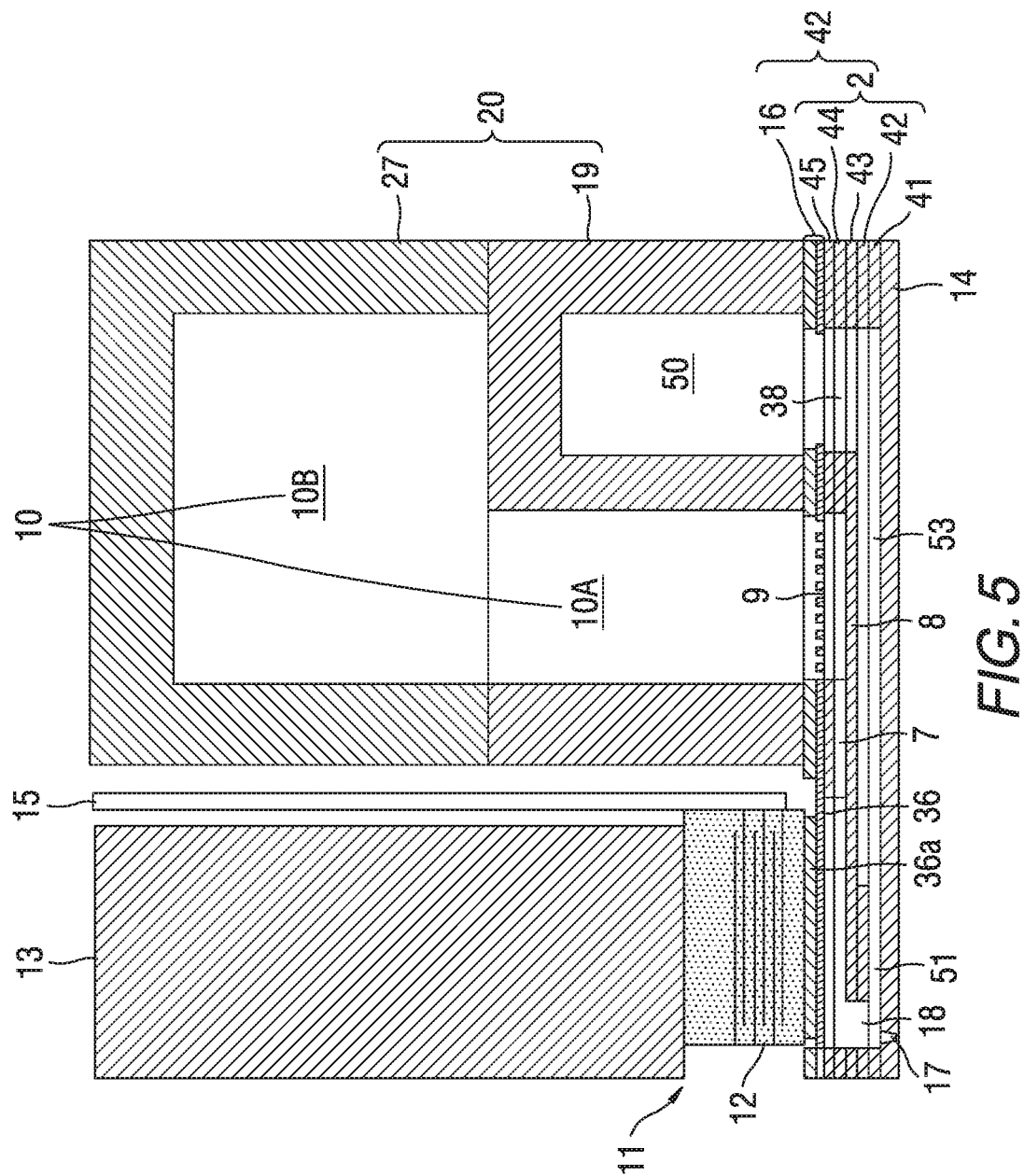
FIG. 5 is a diagram illustrating a cross section of the ink discharging head illustrated in FIG. 4 in a direction orthogonal to the nozzle arrangement direction.
Figure 6:
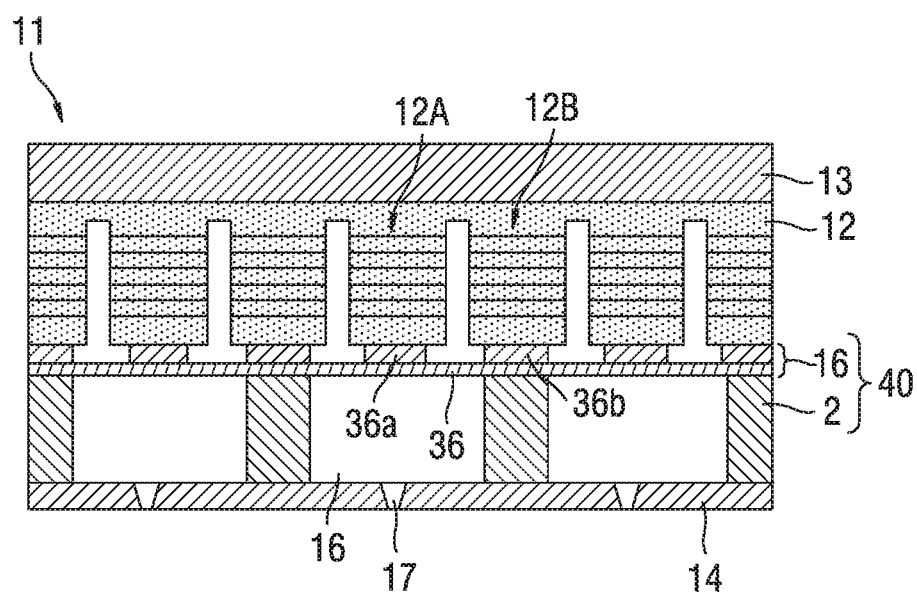
FIG. 6 is a diagram illustrating a cross section of the ink discharging head illustrated in FIG. 4 in a direction parallel to the nozzle arrangement direction.
Figure 7:
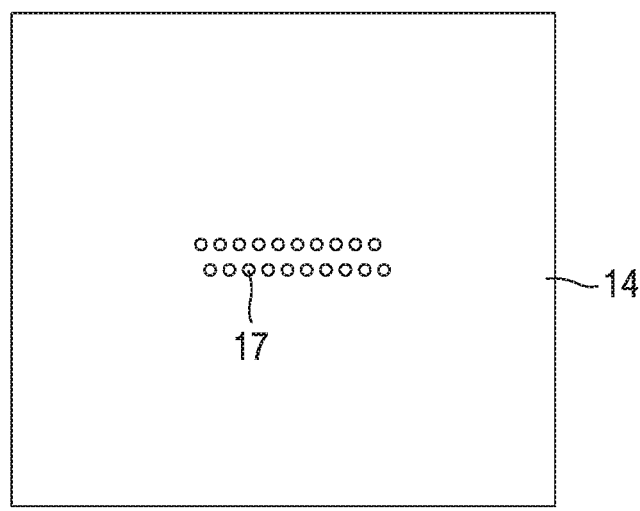
FIG. 7 is a diagram illustrating a planar view of a nozzle plate as an example of the ink discharging head illustrated in FIG. 4.

The ink discharging head is described using an example with reference to FIG. 4 to FIG. 9. FIG. 4 is a diagram illustrating a perspective outlook view of an example of the ink discharging head. FIG. 5 is a diagram illustrating a cross section of the example of the ink discharging head illustrated in FIG. 4 in the direction orthogonal to the nozzle arrangement direction. FIG. 6 is a diagram illustrating a cross section of the example of the ink discharging head illustrated in FIG. 4 in the direction parallel to the nozzle arrangement direction. FIG. 7 is a diagram illustrating a nozzle plate as the example of the ink discharging head illustrated in FIG. 4. FIGS. 8A to 8F are diagrams illustrating planar views of each member constituting the flow path members as the examples of the ink discharging head illustrated in FIG. 4. FIG. 9A and FIG. 9B are diagrams illustrating planar views of each member constituting the common liquid chamber of the head as the examples of the ink discharging head illustrated in FIG. 4.

Note that the liquid referred to below has the same meaning as ink.

In the liquid discharging head, a nozzle plate 14, a flow path plate 2, and a diaphragm member 16 as wall member are laminated and jointed to each other. Also, the ink discharging head includes a piezoelectric actuator 11 to displace the diaphragm member 16, a common liquid chamber member 20, and a cover 29.

The nozzle plate 14 includes multiple nozzles 17 to discharge liquid.

The flow path plate 2 forms an individual liquid chamber 18 communicating with a nozzle 17, a liquid resistance 7 communicating with the individual liquid chamber 18, and a liquid introducing portion 8 communicating with the liquid resistance 7. In addition, the flow path plate 2 is formed of a plurality of plate-like members 41 to 45 laminated and jointed to each other from the side of the nozzle plate 14. These plate-like members 41 to 45 and the diaphragm member 16 are laminated and attached to each other to form a flow path member 40.

The diaphragm member 16 includes a filter portion 9 as an orifice causing the liquid introducing portion 8 to communicate with a common liquid chamber 10 formed of the common liquid chamber member 20.

The diaphragm member 16 is a wall surface member forming the wall surface of the individual liquid chamber 18 of the flow path plate 2. This diaphragm member 16 has a double layer structure (but not limited thereto) formed of a first layer forming a thin portion and a second layer forming a thick portion from the side of flow path plate 2. The first layer forms a transformable vibration area 36 at the site corresponding to the individual liquid chamber 18.

The nozzle plate 14 includes multiple nozzles 17 disposed in a zigzag manner as illustrated in FIG. 7.

Figure 8A:
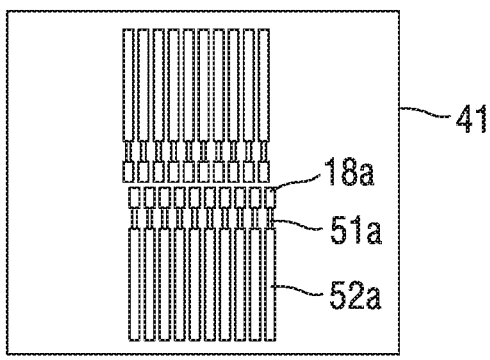
FIG. 8A is a diagram illustrating a planar view of each member constituting a flow path as an example of the ink discharging head illustrated in FIG. 4.

On the plate-like member 41 forming the flow path plate 2, a through-hole groove portion (i.e., a through hole having a groove-like form) 18a constituting the individual liquid chamber 18, and through hole groove portions 51a and 52a constituting the liquid resistance 51 and the circulation flow path 52 are formed as illustrated in FIG. 8A.

Figure 8B:
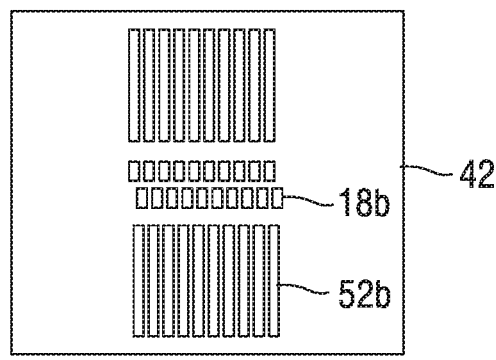
FIG. 8B is a diagram illustrating a planar view of each member constituting a flow path as an example of the ink discharging head illustrated in FIG. 4.

Similarly, on the plate-like member 42, a through-hole groove portion 18b constituting the individual liquid chamber 18 and a through hole groove portion 52b constituting the circulation flow path 52 are formed as illustrated in FIG. 8B.

Figure 8C:
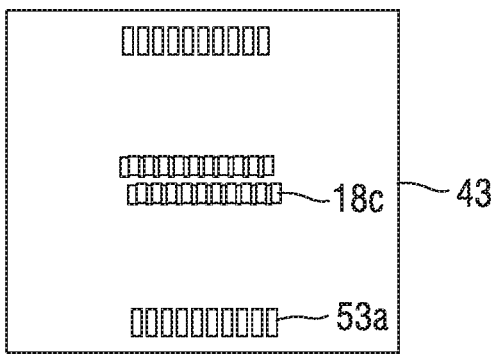
FIG. 8C is a diagram illustrating a planar view of each member constituting a flow path as an example of the ink discharging head illustrated in FIG. 4.

Similarly, on the plate-like member 43, a through-hole groove portion 18c constituting the individual liquid chamber 18 and a through hole groove portion 53a constituting a circulation flow path 53 with the nozzle disposition direction along the longitudinal direction are formed as illustrated in FIG. 8C.

Figure 8D:
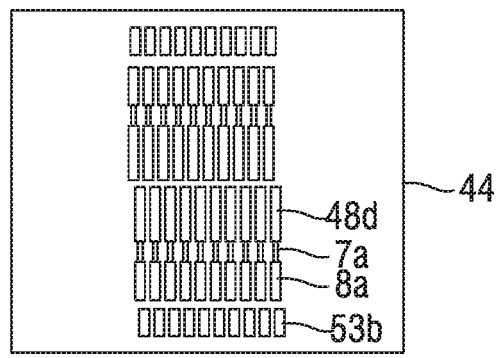
FIG. 8D is a diagram illustrating a planar view of each member constituting a flow path as an example of the ink discharging head illustrated in FIG. 4.

Similarly, on the plate like member 44, a through-hole groove portion 18d constituting the individual liquid chamber 18, a through-hole groove portion 7a constituting a liquid resistance 7, a through-hole groove portion 8a constituting the liquid introducing portion 8, and a through-hole groove portion 53b constituting the circulation flow path 53 with the nozzle disposition direction along the longitudinal direction are formed as illustrated in FIG. 8D.

Figure 8E:
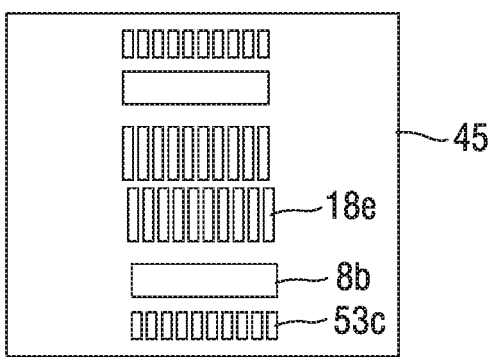
FIG. 8E is a diagram illustrating a planar view of each member constituting a flow path as an example of the ink discharging head illustrated in FIG. 4.

Similarly, on the plate-like member 45, a through-hole groove portion 18e constituting the individual liquid chamber 18, a through-hole portion 8b (forming a liquid chamber on the downstream of the filter) constituting the liquid introducing portion 8 with the nozzle disposition direction along the longitudinal direction, and a through-hole groove portion 53c constituting a circulation flow path 53 with the nozzle disposition direction along the longitudinal direction are formed as illustrated in FIG. 8E.

Figure 8F:
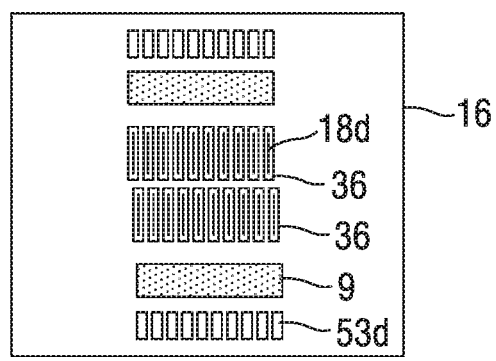
FIG. 8F is a diagram illustrating a planar view of each member constituting a flow path as an example of the ink discharging head illustrated in FIG. 4.

Similarly, on the diaphragm member 16, the vibration area 36, the filter portion 9, and a through-hole groove portion 53d constituting the circulation flow path 53 with the nozzle disposition direction along the longitudinal direction are formed as illustrated in FIG. 8F.

Such a simple configuration having the flow path member constituted of laminated and jointed multiple plate-like members can form complicated flow paths.

According to this configuration, on the flow path member 40 formed of the flow path plate 2 and the diaphragm member 16, the liquid resistance 51 along the surface direction of the flow path plate 2 communicating with each of the individual liquid chambers 18, the circulation flow path 52, and the circulation flow path 53 disposed along the thickness direction of the flow path member 40 communicating with the circulation flow path 52 are formed. The circulation flow path 53 communicates with a circulation common liquid chamber 50, which is described later.

The common liquid chamber member 20 includes the common liquid chamber 10 and the circulation common liquid chamber 50 to which the liquid is supplied from a supply and circulation assembly.

Figure 9A:
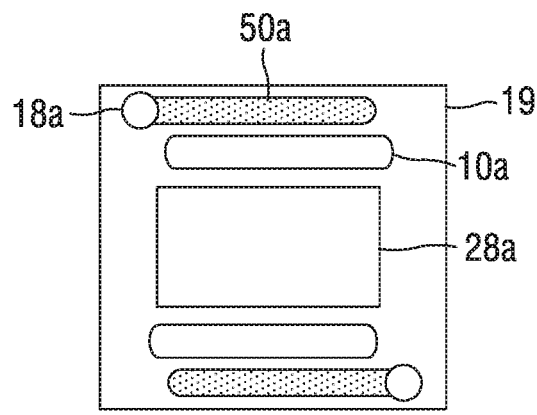
FIG. 9A is a diagram illustrating a planar view of each member constituting a common liquid chamber as an example of the ink discharging head illustrated in FIG. 4.

As illustrated in FIG. 9A, on a first common liquid chamber member 19 constituting the common liquid chamber member 20, there are formed a through-hole 28a for piezoelectric actuator, a through-hole groove portion 10a constituting a common liquid chamber 10A on the downstream side, and a groove portion 50a with a basement, which constitutes the circulation common liquid chamber 50.

Figure 9B:
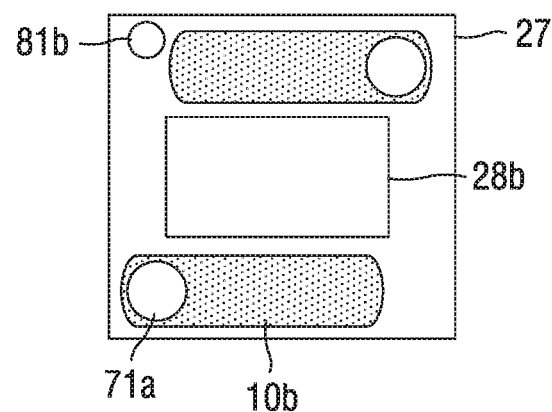
FIG. 9B is a diagram illustrating a planar view of each member constituting a common liquid chamber as an example of the ink discharging head illustrated in FIG. 4.

As illustrated in FIG. 9B, on a second common liquid chamber member 27, there are formed a through hole 28b for piezoelectric actuator and a groove portion 10b constituting a common liquid chamber 10B on the upstream.

In addition, as illustrated in FIG. 4, on the second common liquid chamber member 27, there are formed a through-hole 71a as a supplying opening communicating one end of the common liquid chamber 10 in the nozzle arrangement direction with a supply port 71.

On the first common liquid chamber member 19 and the second common liquid chamber member 27, there are formed through-holes 81a and 81b communicating the other end (the end on the opposite side of the through-hole 71a) of the circulation common liquid chamber 50 in the nozzle arrangement direction with a circulation port 81.

Note that, in FIGS. 9A and 9B, the groove portion with a basement is illustrated in solid (this applies to the drawings thereafter).

The common liquid chamber member 20 is constituted of the first common liquid chamber member 19 and the second common liquid chamber member 27. The first common liquid chamber member 19 is jointed to the flow path member 40 on the side of the diaphragm member 16 and the second common liquid chamber member 27 is laminated and jointed to the first common liquid chamber member 19.

The first common liquid chamber member 19 forms a common liquid chamber 10A on the downstream side, which partially constitutes the common liquid chamber 10 communicating with the liquid introducing portion 8 and the circulation common liquid chamber 50 communicating with the circulation flow path 53. In addition, the second common liquid chamber member 27 forms the common liquid chamber 10B on the upstream side, which constitutes the rest of the common liquid chamber 10.

The common liquid chamber 10A on the downstream side forming a part of the common liquid chamber 10 and the circulation common liquid chamber 50 are disposed side by side in the direction orthogonal to the nozzle arrangement direction. Also, the circulation common liquid chamber 50 is disposed at the position projected in the common liquid chamber 10.

Due to this, the dimension of the circulation common liquid chamber 50 obtains freedom of designing from the dimension required for the flow paths including the individual liquid chamber 18, the liquid resistance 7, and the liquid introducing portion 8 formed of the flow path member 40.

Moreover, since the circulation common liquid chamber 50 is disposed side by side with a part of the common liquid chamber 10 and the circulation common liquid chamber 50 is positioned in the projection thereof in the common liquid chamber 10, the width of the head along the direction orthogonal to the nozzle arrangement direction can be reduced, thereby preventing a size increase of the head. The common liquid chamber member 20 includes the circulation common liquid chamber 50 and the common liquid chamber 10 to which the liquid is supplied from a head tank or a liquid cartridge.

On the opposite side of the diaphragm member 16 relative to the individual liquid chamber 18 is arranged the piezoelectric actuator 11 including an electromechanical transducer element as a drive device to transform the vibration area 36 of the diaphragm member 16.

As illustrated in FIG. 6, this piezoelectric actuator 11 includes a piezoelectric element 12 jointed onto a base member 13. The piezoelectric element 12 is grooved by half cut dicing and a particular number of piezoelectric elements 12A and 12B having a columnar form are formed on the single piezoelectric element 12 in a pectinate manner spaced a predetermined distance therebetween.

Although the piezoelectric element 12A of the piezoelectric element 12 is used as a piezoelectric element driven by a drive waveform and the piezoelectric element 12B of the piezoelectric element 12 is used as a simple supporting column without an application of a drive waveform, all of the piezoelectric elements 12A and the piezoelectric elements 12B can be used as piezoelectric elements driven by drive waveforms.

The piezoelectric element 12A is jointed to a convex portion 36a, which is a thick part having an island-like form formed on the vibration area 36 of the diaphragm member 16. The piezoelectric element 12B is jointed to a convex portion 36b, which is a thick part of the diaphragm member 16.

This piezoelectric element 12 is formed by alternately laminating piezoelectric layers and inner electrodes. Each of the inner electrodes is pulled out to the exterior to provide outer electrodes, to which flexible wiring members 15 is connected.

In the liquid discharging head having such a configuration, for example, the piezoelectric element 12A shrinks when the voltage applied to the piezoelectric element 12A is lowered from a reference voltage. For this reason, the vibration area 36 of the diaphragm member 16 is lowered, thereby inflating the volume of the individual liquid chamber 18, so that the liquid flows into the individual liquid chamber 18.

Thereafter, the voltage applied to the piezoelectric element 12A is raised to elongate the piezoelectric element 12A in the lamination direction, thereby transforming the vibration area 36 of the diaphragm member 16 in the direction of the nozzle 17. As a result, the volume of the individual liquid chamber 18 is reduced so that the liquid in the individual liquid chamber 18 is pressurized and discharged from the nozzle 17.

Thereafter, the voltage applied to the piezoelectric element 12A is returned to the reference voltage. Accordingly, the vibration area 36 of the diaphragm member 16 is back to the initial position so that the individual liquid chamber 18 inflates, which generates a negative pressure. At this point in time, the liquid is supplied from the common liquid chamber 10 to the individual liquid chamber 18. After the vibration of the meniscus surface of the nozzle 17 decays and becomes stable, the system starts operations to discharge next droplets.

The drive method of the head is not limited to the above-mentioned (pull-push discharging). The way of discharging changes in accordance with how a drive waveform is provided, and pull discharging or push discharging is possible. In addition, in the embodiment described above, the pressure-generating device to change the pressure to the individual liquid chamber 18 is a laminated piezoelectric element but is not limited thereto. For example, a piezoelectric element having a thin film-like form can be used. Moreover, it is also possible to use a heat element which is disposed in the individual liquid chamber 18 and generates heat to produce air bubbles to change the pressure or an element causing a pressure change utilizing the electrostatic force.

In addition, as the polymerization initiator which can be used for the acrylamide compound A1 having an ester structure contained in the composition of the present disclosure, an ionic polymerization initiator is also usable other than the photoinitiator. However, ionic polymerization initiators are generally not only expensive, but also produce strong acids and alkalis slightly even in the absence of light, which requires the ink supply path in the inkjet discharging device to have acid resistance and alkali resistance. Therefore, latitude of selection of members constituting the inkjet discharging device is restricted. On the other hand, when the photopolymerization initiator containing the polymerization initiator B1 is used, selection of the members in the inkjet discharging head becomes easy since it is inexpensive and does not produce a strong acid or a strong alkali.

Epoxy Adhesive

The epoxy adhesive used for bonding in the inkjet discharging device contains an epoxy compound, a curing agent, and other optional components. In addition, the epoxy adhesive includes an epoxy-based adhesive containing an epoxy compound as the major component.

Elastic Modulus of Cured Product

When the elastic modulus of a cured product obtained by curing an epoxy adhesive at 90 degrees C. for four hours is defined as elastic modulus $E_1$ (GPa) and the elastic modulus of the cured product immersed in the active energy ray curable ink at 60 degrees C. for four weeks is defined as elastic modulus $E_2$ (GPa), the decreasing ratio of the elastic modulus represented by the following relationship 1 is preferably 50 percent or less and more preferably 10 percent or less. When the ratio of the decrease in elastic modulus is 50 percent or less, it is possible to prevent degradation of discharging stability caused by the decrease in elastic modulus.

Elastic modulus decrease ratio (percent)=$\{(E_1-E_2)/E_1\}\times 100$     Relationship 1

Elastic modulus $E_1$ of the cured product is preferably 3.5 GPa or more and more preferably 4.0 GPa or more. When elastic modulus $E_1$ of the cured product is 3.5 GPa or more, rigidity of the flow path becomes high and the discharging stability of the ink can be enhanced.

Martens Hardness of Cured Product

When Martens hardness of the cured product obtained by curing an epoxy adhesive at 90 degrees C. for four hours is defined as $M_1$ (GPa) and Martens hardness of the cured product immersed in the active energy ray curable ink at 60 degrees C. for four weeks is defined as $M_2$, the decreasing ratio of Martens hardness represented by the following relationship 2 is preferably 50 percent or less and more preferably 10 percent or less. When the decreasing ratio of Martens hardness is 50 percent or less, it is possible to prevent degradation of discharging stability caused by the decrease in Martens hardness.

Martens hardness decrease ratio (percent)=$\{(M_1-M_2)/M_1\}\times 100$     Relationship 2

Martens hardness $M_1$ of the cured product is preferably 180 N/mm$^2$ or more and more preferably 200 N/mm$^2$. When Martens hardness $M_1$ is 180 N/mm$^2$ or more, rigidity of the flow path becomes high and the discharging stability of the ink can be enhanced.

The elastic modulus and Martens hardness can be measured by, for example, indenting a Vickers indenter using a microhardness tester (FISCHERSCOPE HM 2000, manufactured by Fisher Instruments). The value of the indentation elastic modulus $Err/(1-v_s^2)$ is referred to as the elastic modulus. As Martens hardness, the value of HM is referred to. Measurement conditions are loading and unloading: 5 mN/10 seconds, creep: 5 seconds.

The amount of the epoxy group in an uncured epoxy adhesive is preferably 0.4 mol/100 g or more and more preferably 0.5 mol/100 g or more. When the content is 0.4 mol/100 g or more and if cured epoxy adhesive (cured product) contacts with an active energy ray curable ink containing a component easily decreasing elastic modulus and Martens hardness of the cured product in an amount of 30 percent by mass, it is possible to prevent a decrease of the elastic modulus and Martens hardness of the cured product.

Note that, the content of the epoxy group in the epoxy adhesive can be calculated according to the following relationship 3 when the epoxy equivalent of each epoxy compound contained in the epoxy adhesive is defined as $Q_1$, $Q_2 \ldots Q_x$ (g/mol) and the weight percent of the epoxy adhesive of each epoxy compound is defined as $W_1$, $W_2 \ldots W_x$ (percent). In addition, the measuring method of the epoxy equivalent of an epoxy compound does not have a particular limit and can be suitably selected to suit to a particular application. For example, the titration method, which is standardized by Japanese Industrial Standard (JIS) K7236, is applicable.

$$\text{Content of epoxy group in epoxy adhesive (mol/100 g)} = \Sigma_i(W_i/Q_i) \quad \text{Relationship 3}$$

In the relationship 3, $\Sigma$ represents a sum and i represents an integer.

Epoxy Compound

The epoxy compound has no particular limit and can be suitably selected to suit to a particular application.

Specific examples include, but are not limited to, a bisphenol A type epoxy compound, a bisphenol F type epoxy compound, a bisphenol S type epoxy compound, a hydrogenated bisphenol A type epoxy compound, a phenol novolak type epoxy compound, a cresol novolac type epoxy compound, a glycidyl ester type epoxy compound, a glycidyl amine type epoxy compound, an alicyclic epoxy compound, a urethane modified epoxy compound, a polysulfide modified epoxy compound, a rubber modified epoxy compound (for example, modified by CTBN: Butadiene-acrylonitrile copolymerized liquid rubber having a carboxyl group at the terminal and ATBN: Butadiene-acrylonitrile copolymerized liquid rubber having an amino group at the terminal), a polyalkylene glycol-type epoxy compounds, an ether elastomer added bisphenol A type epoxy compound, a liquid urethane resin added bisphenol A type epoxy compound, and a dimer acid-modified epoxy compound.

These can be used alone or in combination. Of these, the bisphenol A type epoxy compound and the bisphenol F type epoxy compound are preferable in terms of curability and adhesiveness.

In addition, as a reactive diluent for the epoxy compound, an epoxy compound having a low viscosity such as n-butyl glycidyl ether and styrene oxide may be used.

The proportion of the content of the epoxy compound in the total content of the epoxy adhesive is preferably 60 percent by mass or more and more preferably 80 percent by mass or more. When the content is 60 percent by mass or more, curability of the epoxy adhesive can be improved.

Curing Agent

The curing agent has no particular limit and a known epoxy curing agent can be suitably selected to suit to a particular application. Examples include, but are not limited to, amine-based compounds such as aromatic amines, aliphatic amines, alicyclic amines, heterocyclic amines, dicyandiamide, hydrazide, amine adducts, acid anhydrides, phenol compounds, thiol compounds, and imidazole compounds.

The proportion of the content of the curing agent in the total content of the epoxy adhesive is preferably from 1 to 30 percent by mass and more preferably from 5 to 20 percent by mass. When the proportion is from 1 to 30 percent by mass, it is possible to ameliorate curability of the epoxy adhesive.

Other Components

Examples of the other components include, but are not limited to, curing accelerators such as tertiary amine compounds and imidazole compounds, fillers such as silica, and additives such as silane coupling agents.

The curing condition of the epoxy adhesive has no particular limit and known curability, curing time, etc., can be selected to suit to a particular application.

The curing temperature has no particular limit and can be suitably selected to suit to a particular application. It is preferably from room temperature (25 degrees C.) to 200 degrees C. and more preferably from 40 to 180 degrees C.

The curing time has no particular limit and can be suitably selected to suit to a particular application. For example, it is preferably from 10 minutes to 48 hours and more preferable from 1 to 24 hours.

Moreover, in order to increase adhesive strength, it is preferable to cure while applying a pressure to the contact part of a contact member.

The acrylamide compound A1 having an ester structure contained in the composition of the present disclosure is less likely to penetrate between the molecules of the epoxy adhesive, in particular, reducing the decrease in elastic modulus and Martens hardness of the cured product by the epoxy adhesive. Due to the ester structure in the acrylamide compound A1, the molar volume in the solubility parameter of Fedor is inferred to increase and the dissolving power to the adhesive is reduced in comparison with the acrylamide compound having no ester structure. If the compound contained in the composition easily penetrates between the molecules of the epoxy adhesive, the adhesive swells and deteriorates, causing a problem of wetted surface property leading to deterioration of discharging stability. Therefore, it is preferable to apply the composition of the present disclosure containing the acrylamide compound A1 having an ester structure to an ink discharging device using an epoxy adhesive for bonding.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto. In the following Examples and Comparative Examples, an active energy ray curable composition was used as the composition.

Components of Active Energy Ray Curable Composition

The compound, the manufacturer, and the product used for preparation of the active energy ray curable composition are shown in Tables 1-1 to 1-3.

The monomer as the acrylamide compound was synthesized by the method described in Synthesis Examples 1 to 11. The synthesized compound was identified by nuclear magnetic resonance spectroscopy (JNM-ECX500, manufactured by JEOL Ltd.), and purity was measured using the gas chromatography (GCMS-QP2010 Plus, manufactured by Shimadzu Corporation). These chemical analysis was conducted by a standard method.

TABLE 1-1

| | Abbreviation | Compound or structure | Manufacturer and product |
|---|---|---|---|
| Acrylamide compound A1 having ester structure | A1-1 | | (Synthesis Example 1) |
| | A1-2 | | (Synthesis Example 2) |
| | A1-3 | | (Synthesis Example 3) |
| | A1-4 | | (Synthesis Example 4) |
| | A1-5 | | (Synthesis Example 5) |
| | A1-6 | | (Synthesis Example 6) |
| | A1-7 | | (Synthesis Example 7) |
| | A1-8 | | (Synthesis Example 8) |
| | A1-9 | | (Synthesis Example 9) |
| | A1-10 | | (Synthesis Example 10) |
| | A1-11 | | (Synthesis Example 11) |

TABLE 1-2

| Polymerizable compounds A2 other than A1 | A2-1 | * see below | DPCA-60, caprolactone modified pentaerythritol hexaacrylate, manufactured by Nippon Kayaku Co., Ltd. |
|---|---|---|---|
| | A2-2 | ![acryloyl morpholine structure] | Acryloyl morpholine (ACMO) manufactured by KJ Chemicals Corporation |
| | A2-3 | ![structure] | (Synthesis Example 12) |
| | A2-4 | ![2-HEMA structure] | 2-hydroxyethyl methacrylate, reagent, manufacture by Tokyo Chemical Industry Co., Ltd. |
| | A2-5 | ![diethylene glycol dimethacrylate structure] | Diethylene glycol dimethacrylate, reagent, manufactured by Tokyo Chemical Industry Co., Ltd. |

*
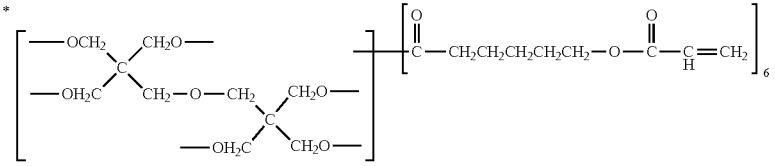

TABLE 1-3

| Polymerization initiator B1 having molecular weight of 800 or more | B1-1 | Polyethylene glycol di(beta-[4-(2-(dimethylamino-2-benzyl) butanylphenyl) piperazine] propionate | Omnipol 910, molecular weight 1032, manufactured by IGM Resins B.V. |
|---|---|---|---|
| | B1-2 | 1,3-di({α-[1-chloro-9-oxo-9H-thioxanthen-4-yl) oxy]acetylpoly[oxy(1-methyl ethylene)]}oxy)-2,2-bis({α-[1-chloro-9-oxo-9H-thioxanthen-4-yl) oxy]acetyl poly[oxy(1-methylethylene)]}oxymethyl)propane | Speedcure 7010, molecular weight 1899, manufactured by Lambson Group Ltd. |
| | B1-3 | A mixture of: -1,3-di({α-4-(dimethylamino)benzoylpoly[oxy(1-methylethylene)]}oxy)-2,2-bis({α-4-(dimethylamino)benzoylpoly[oxy(1-methylethylene)]}oxymethyl) propane and; {a-4-(dimethylamino)benzoylpoly(oxyethylene)-poly[oxy(1-methylethylene)]-poly(oxyethylene)} 4-(dimethylamino)benzoate | Speedcure 7040, molecular weight 1066, manufactured by Lambson Group Ltd. |
| | B1-4 | Polybutyleneglycol bis(9-oxo-9H-thioxanthenyloxy)acetate | Omnipol TX, molecular weight 820, manufactured by IGM Resins B.V. |
| | B1-5 | Structure not disclosed | Genopol TX-2, molecular weight 980, |

TABLE 1-3-continued

| | | | |
|---|---|---|---|
| | B1-6 | Benzene, (1-methylethenyl)-, homopolymer, ar-(2-hydroxy-2-methyl-1-oxopropyl) derivs | manufactured by Lahn AG Esacure ONE, molecular weight 1000 or more, manufactured by IGM Resins B.V. |
| Polymerization initiator B2 other than B1 | B2-1 | Bis(2,4,6-trimethyl benzoyl)phenylphosphine oxide | IRGACURE 819, manufactured by BASF Japan Ltd. |
| | B2-2 | 2-(dimethylamino)-2-[(4-methylphenyl)methyl]-1-[4-(4-morphonyl)phenyl]-1-butanone | IRGACURE 379, manufactured by BASF Japan Ltd. |
| | B2-3 | 1-hydroxy-cyclohexyl-phenyl-ketone | IRGACURE 184, manufactured by BASF Japan Ltd. |
| | B2-4 | 2-[4-(methylthio)benzoyl]-2-(4-morpholinyl)propane | IRGACURE 907, manufactured by BASF Japan Ltd. |
| | B2-5 | 2,4,6-trimethylbenzoyl-diphenyl-phosphine oxide | IRGACURE TPO, manufactured by BASF Japan Ltd. |
| Other components | Polymerization Inhibitor | 4-methoxyphenol | Methoquinone, manufactured by Seiko Chemical Co., Ltd. |
| | Surfactant | Silicone-based surfactant | BYK-UV 3510, manufactured by BYK Japan KK. |

B2-1: Bis(2,4,6-trimethylbenzoyl)phenyl phosphine oxide, molecular weight = 418
B2-2: 2-(dimethylamino)-2-[(4-methylphenyl)methyl]-1-[4-(4-morpholinyl)phenyl]-1-butanone, molecular weight = 380
B2-3: 1-hydroxy-cyclohexyl-phenyl-ketone, molecular weight = 204
B2-4: 2-[4-(methylthio)benzoyl]-2-(4-morpholinyl)propane, molecular weight = 279
B2-5: 2,4,6-trimethylbenzoyl-diphenyl phosphine oxide, molecular weight = 316

Next, synthesis examples of the compounds shown in Tables 1-1 and 1-2 will be described in detail below.

Synthetic Example 1

Synthesis of N-Acryloyl-N-Methylglycine Methyl Ester (A1-1)

0.30 mol of N-methylglycine methyl ester hydrochloride (reagent, manufactured by Sigma Aldrich Japan Co., Ltd.), 0.45 mol of potassium carbonate (reagent, manufactured by Kanto Chemical Co., Inc.), and 400 mL of water were stirred and mixed at 0 to 10 degrees C. Thereafter, 0.33 mol of acrylic acid chloride (reagent, manufactured by Wako Pure Chemical Industries, Ltd.) was slowly dripped while maintaining the temperature. After completion of the dripping and three-time extraction with 400 mL of ethyl acetate (reagent, manufactured by Kanto Chemical Co., Inc.), the resultant was rinsed with 400 mL of water including ethyl acetate layers. Ethyl acetate was distilled away at 40 degrees C. under a reduced pressure to obtain 0.20 mol of the target N-acryloyl-N-methylglycine methyl ester A1-1 as an almost colorless and transparent liquid. The purity was 98.3 percent by mass.

The molecular weight of N-acryloyl-N-methylglycine methyl ester A1-1 was 157.2, which was a known compound (CAS registration number 72065-23-7).

Synthesis Example 2

Synthesis of N-Acryloyl-N-Methylglycine Ethyl Ester A1-2

0.22 mol of the target N-acryloyl-N-methylglycine ethyl ester (A1-2) was obtained as an almost colorless and transparent liquid in the same manner as in Synthesis Example 1 except that N-methylglycine methyl ester hydrochloride was changed to N-methylglycine ethyl ester hydrochloride (reagent, manufactured by Tokyo Chemical Industry Co. Ltd.). The purity was 98.5 percent by mass.

The molecular weight of N-acryloyl-N-methylglycine ethyl ester A1-2 was 171.2, which was a known compound (CAS registration number 170116-05-9).

Synthesis Example 3

Synthesis of N-Acryloylpiperidine-3-Carboxylic Acid Ethyl Ester A1-3

0.26 mol of the target N-acryloylpiperidine-3-carboxylic acid ethyl ester A1-3 was obtained as an almost colorless and transparent liquid in the same manner as in Synthesis Example 1 except that N-methylglycine methyl ester hydrochloride was changed to piperidine-3-carboxylic acid ethyl ester (reagent, manufactured by Tokyo Chemical Industry Co. Ltd.). The purity was 98.2 percent by mass.

The molecular weight of N-acryloylpiperidine-3-carboxylic acid ethyl ester A1-3 was 211.3, which was a known compound (CAS registration number 1156229-85-4).

Synthesis Example 4

Synthesis of N-Acryloylpiperidine-4-Carboxylic Acid Methyl Ester A1-4

0.25 mol of the target N-acryloylpiperidine-4-carboxylic acid methyl ester A1-4 was obtained as an almost colorless and transparent liquid in the same manner as in Synthesis Example 1 except that N-methylglycine methyl ester hydrochloride was changed to piperidine-4-carboxylic acid methyl ester (reagent, manufactured by Tokyo Chemical Industry Co. Ltd.). The purity was 98.6 percent by mass.

The molecular weight of N-acryloylpiperidine-4-carboxylic acid methyl ester A1-4 was 197.2, which was a known compound (CAS registration number 845907-51-9).

Synthesis Example 5

Synthesis of N-Acryloylpiperidine-4-Carboxylic Acid Ethyl Ester A1-5

0.27 mol of the target N-acryloylpiperidine-4-carboxylic acid ethyl ester A1-5 was obtained as an almost colorless and transparent liquid in the same manner as in Synthesis Example 1 except that N-methylglycine methyl ester hydrochloride was changed to piperidine-4-carboxylic acid ethyl ester (reagent, manufactured by Tokyo Chemical Industry Co. Ltd.). The purity was 99.2 percent by mass.

The molecular weight of N-acryloylpiperidine-4-carboxylic acid ethyl ester A1-5 was 211.3, which was a known compound (CAS registration number 845907-79-1).

Synthesis Example 6

Synthesis of Methacryloyloxyethyl Acrylamide A1-6

N-(2-hydroxyethyl)acrylamide (manufactured by Tokyo Chemical Industry Co., Ltd.) (13.0 g, 113 mmol) was added to dehydrated dichloromethane (70 mL), the inside of the flask was replaced with argon gas, and thereafter, triethylamine (17.2 g, 170 mmol) were added. After cooling the mixture to about −10 degrees C., methacrylic acid chloride (14.6 g, 140 mmol) was slowly dripped in such a manner that the system temperature became −10 to −5 degrees C. followed by two-hour stirring at room temperature. The precipitate was removed by filtration and the filtrate was rinsed with water, saturated aqueous solution of sodium hydrogen carbonate, saturated aqueous solution of sodium chloride, and dried with sodium sulfate followed by condensation under a reduced pressure to obtain a brown oil material. The thus-obtained oil material was purified by column chromatography (Wakogel C300, 500 g) to obtain 13.0 g (yield: about 66 percent) of a colorless oil.

Synthesis Example 7

Synthesis of N-Acryloyl-N-Isopropylglycine Isopropyl Ester A1-7

0.22 mol of the target N-acryloyl-N-isopropylglycine isopropyl ester A1-7 was obtained as an almost colorless and transparent liquid in the same manner as in Synthesis Example 1 except that N-methylglycine methyl ester hydrochloride was changed to N-methylglycine ethyl ester hydrochloride (reagent, manufactured by Tokyo Chemical Industry Co. Ltd.). The purity was 98.5 percent by mass.

The molecular weight of N-acryloyl-N-isopropyl ester A1-7 was 213.3, which was a known compound (CAS registration number 2225738-66-7).

Synthesis Example 8

Synthesis of N-Acryloyl-N-Isopropylglycine Methyl Ester A1-8

0.21 mol of the target N-acryloyl-N-isopropylglycine isopropyl ester A1-8 was obtained as an almost colorless and transparent liquid in the same manner as in Synthesis Example 1 except that N-methylglycine methyl ester hydrochloride was changed to N-methylglycine isopropyl ester hydrochloride (reagent, manufactured by Tokyo Chemical Industry Co. Ltd.). The purity was 98.7 percent by mass.

The molecular weight of N-acryloyl-N-isopropylglycine methyl ester A1-8 was 185.2, which was a known compound (CAS registration number 1178019-29-8).

Synthesis Example 9

Synthesis of N-Acryloyl-N-Methylalanine Methyl Ester A1-9

0.20 mol of the target N-acryloyl-N-methylalanine methyl ester A1-9 was obtained as an almost colorless and transparent liquid in the same manner as in Synthesis Example 1 except that N-methylglycine methyl ester hydrochloride was changed to N-methylalanine methyl ester hydrochloride (reagent, manufactured by Tokyo Chemical Industry Co. Ltd.). The purity was 98.9 percent by mass.

The molecular weight of N-acryloyl-N-methylalanine methyl ester A1-9 was 171.2, which was a known compound (CAS registration number 2225738-68-9).

Synthesis Example 10

Synthesis of N-Acryloyl-N-Methylglycine Isopropyl Ester A1-10

0.19 mol of the target N-acryloyl-N-methylalanine methyl ester A1-10 was obtained as an almost colorless and transparent liquid in the same manner as in Synthesis Example 1 except that N-methylglycine methyl ester hydrochloride was changed to N-methylglycine isopropyl ester hydrochloride (reagent, manufactured by Tokyo Chemical Industry Co. Ltd.). The purity was 99.5 percent by mass.

The molecular weight of N-acryloyl-N-methylisopropyl isopropyl ester A1-10 was 185.2, which was a known compound (CAS registration number 2225738-65-6).

Synthesis Example 11

Synthesis of N-Acryloyl-N-Methylalanine Isopropyl Ester A1-11

0.23 mol of the target N-acryloyl-N-methylalanine methyl ester A1-11 was obtained as an almost colorless and transparent liquid in the same manner as in Synthesis Example 1 except that N-methylglycine methyl ester hydrochloride was changed to N-methylalanine isopropyl ester hydrochloride (reagent, manufactured by Tokyo Chemical Industry Co. Ltd.). The purity was 98.4 percent by mass.

The molecular weight of N-acryloyl-N-methylalanine isopropyl ester A1-11 was 185.2, which was a known compound (CAS registration number 2225738-71-4).

Synthesis Example 12

Synthesis of Compound A-2-3

5.4 g (25 mmol) of 1-(acryloyloxy)-3-(methacryloyloxy)-2-propanol, manufactured by Tokyo Chemical Industry Co., Ltd. was added to 100 mL of dehydrated dichloromethane. After replacing the inside of the flask with argon gas, 3.6 g (36 mmol) of triethylamine was added.

After cooling the mixture to about −10 degrees C., 2.4 g (30 mmol) of acetic acid chloride was slowly dripped in such a manner that the system temperature became −10 to −5 degrees C. followed by two-hour stirring at room temperature. Moreover, after precipitates were removed by filtration, the filtrate was rinsed with water, an aqueous solution of saturated sodium hydrogen carbonate, and an aqueous solution of saturated sodium chloride.

Thereafter, subsequent to drying with sodium sulfate, the resultant was condensed under a reduced pressure to obtain yellow oily matter. Furthermore, 200 g of Wakogel C300 (manufactured by Wako Pure Chemical Industries, Ltd.) was loaded, and the yellow oily matter was purified by column chromatography using hexane and ethyl acetate as an eluent to obtain 1.8 g (yield: about 28 percent) of colorless oily matter of the compound represented by the chemical formula illustrated in Table 1-2. The purity was 99.1 percent by mass.

Example 1

Preparation of Active Energy Ray Curable Composition

A1-1: 95.8 percent by mass, B1-1: 4.0 percent by mass, polymerization inhibitor: 0.1 percent by mass, and a surfactant: 0.1 percent by mass were sequentially added and stirred for two hours. After visually confirmed that there was no undissolved residue, the solution was filtered through a membrane filter to remove coarse particles to prepare an active energy ray curable composition of Example 1.

Examples 2 to 56 and Comparative Examples 1 to 16

Active energy ray curable compositions of Examples 2 to 56 and Comparative Examples 1 to 16 were manufactured in the same manner as in Example 1 except that the compositions and the contents (percent by mass) were changed as shown in Tables 2 to 7 below.

TABLE 2

| | Example | | | | | | |
|---|---|---|---|---|---|---|---|
| | 1 | 2 | 3 | 4 | 5 | 6 | 7 |
| A1-1 | 95.8 | 94.8 | 89.8 | | | | |
| A1-2 | | | | 94.8 | 89.8 | | |
| A1-3 | | | | | | 94.8 | 89.8 |
| A1-4 | | | | | | | |
| A1-5 | | | | | | | |
| A1-6 | | | | | | | |
| A1-7 | | | | | | | |
| A1-8 | | | | | | | |
| A1-9 | | | | | | | |
| A1-10 | | | | | | | |
| A1-11 | | | | | | | |
| A2-1 | | | | | | | |
| A2-2 | | | | | | | |
| A2-3 | | | | | | | |
| A2-4 | | | | | | | |
| A2-5 | | | | | | | |
| B1-1 | 4.0 | 5.0 | 10.0 | 5.0 | 10.0 | 5.0 | 10.0 |
| B1-2 | | | | | | | |
| B1-3 | | | | | | | |
| B1-4 | | | | | | | |
| B1-5 | | | | | | | |
| B1-6 | | | | | | | |
| B2-1 | | | | | | | |
| B2-2 | | | | | | | |
| B2-3 | | | | | | | |
| B2-4 | | | | | | | |
| B2-5 | | | | | | | |
| Polymerization inhibitor | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 |
| Total (Percent by mass) | 100.0 | 100.0 | 100.0 | 100.0 | 100.0 | 100.0 | 100.0 |

| | Example | | | | | | |
|---|---|---|---|---|---|---|---|
| | 8 | 9 | 10 | 11 | 12 | 13 | 14 |
| A1-1 | | | 17.8 | 13.0 | 59.8 | 39.8 | |
| A1-2 | | | 18.0 | 12.8 | | | |
| A1-3 | | | 18.0 | 12.8 | | | |
| A1-4 | 94.8 | | 18.0 | 12.8 | | | |
| A1-5 | | 89.8 | 18.0 | 12.8 | | | 95.8 |
| A1-6 | | | | 12.8 | | | |
| A1-7 | | | | | | | |
| A1-8 | | | | | | | |
| A1-9 | | | | | | | |
| A1-10 | | | | | | | |
| A1-11 | | | | | | | |
| A2-1 | | | | 12.8 | 20.0 | 20.0 | |
| A2-2 | | | | | 10.0 | 30.0 | |
| A2-3 | | | | | | | |
| A2-4 | | | | | | | |
| A2-5 | | | | | | | |
| B1-1 | 5.0 | 10.0 | 10.0 | 10.0 | 10.0 | 10.0 | 4.0 |
| B1-2 | | | | | | | |
| B1-3 | | | | | | | |
| B1-4 | | | | | | | |
| B1-5 | | | | | | | |
| B1-6 | | | | | | | |
| B2-1 | | | | | | | |
| B2-2 | | | | | | | |
| B2-3 | | | | | | | |
| B2-4 | | | | | | | |
| B2-5 | | | | | | | |
| Polymerization inhibitor | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 |
| Total (Percent by mass) | 100.0 | 100.0 | 100.0 | 100.0 | 100.0 | 100.0 | 100.0 |

TABLE 3

| | Example | | | | | | |
|---|---|---|---|---|---|---|---|
| | 15 | 16 | 17 | 18 | 19 | 20 | 21 |
| A1-1 | | | | | | | |
| A1-2 | | | | | | | |
| A1-3 | | | | | | | |
| A1-4 | | | | | | | |
| A1-5 | | | | | | | |
| A1-6 | | | | | | | |
| A1-7 | 95.8 | 94.8 | 89.8 | | | | |
| A1-8 | | | | 94.8 | 89.8 | | |
| A1-9 | | | | | | 94.8 | 89.8 |
| A1-10 | | | | | | | |
| A1-11 | | | | | | | |

TABLE 3-continued

|  |  |  |  |  |  |  |  |
|---|---|---|---|---|---|---|---|
| A2-1 |  |  |  |  |  |  |  |
| A2-2 |  |  |  |  |  |  |  |
| A2-3 |  |  |  |  |  |  |  |
| A2-4 |  |  |  |  |  |  |  |
| A2-5 |  |  |  |  |  |  |  |
| B1-1 | 4.0 | 5.0 | 10.0 | 5.0 | 10.0 | 5.0 | 10.0 |
| B1-2 |  |  |  |  |  |  |  |
| B1-3 |  |  |  |  |  |  |  |
| B1-4 |  |  |  |  |  |  |  |
| B1-5 |  |  |  |  |  |  |  |
| B1-6 |  |  |  |  |  |  |  |
| B2-1 |  |  |  |  |  |  |  |
| B2-2 |  |  |  |  |  |  |  |
| B2-3 |  |  |  |  |  |  |  |
| B2-4 |  |  |  |  |  |  |  |
| B2-5 |  |  |  |  |  |  |  |
| Polymerization inhibitor | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 |
| Total (Percent by mass) | 100.0 | 100.0 | 100.0 | 100.0 | 100.0 | 100.0 | 100.0 |

|  | Example | | | | | | |
|---|---|---|---|---|---|---|---|
|  | 22 | 23 | 24 | 25 | 26 | 27 | 28 |
| A1-1 |  |  |  |  |  |  |  |
| A1-2 |  |  |  |  |  |  |  |
| A1-3 |  |  |  |  |  |  |  |
| A1-4 |  |  |  |  |  |  |  |
| A1-5 |  |  |  |  |  |  |  |
| A1-6 |  |  |  |  |  |  |  |
| A1-7 |  |  | 17.8 | 13.0 | 59.8 |  |  |
| A1-8 |  |  | 18.0 | 12.8 |  | 39.8 |  |
| A1-9 |  |  | 18.0 | 12.8 |  |  |  |
| A1-10 | 94.8 |  | 18.0 | 12.8 |  |  |  |
| A1-11 |  | 89.8 | 18.0 | 12.8 |  |  | 95.8 |
| A2-1 |  |  |  | 12.8 | 20.0 | 20.0 |  |
| A2-2 |  |  |  | 12.8 | 10.0 | 30.0 |  |
| A2-3 |  |  |  |  |  |  |  |
| A2-4 |  |  |  |  |  |  |  |
| A2-5 |  |  |  |  |  |  |  |
| B1-1 | 5.0 | 10.0 | 10.0 | 10.0 | 10.0 | 10.0 | 4.0 |
| B1-2 |  |  |  |  |  |  |  |
| B1-3 |  |  |  |  |  |  |  |
| B1-4 |  |  |  |  |  |  |  |
| B1-5 |  |  |  |  |  |  |  |
| B1-6 |  |  |  |  |  |  |  |
| B2-1 |  |  |  |  |  |  |  |
| B2-2 |  |  |  |  |  |  |  |
| B2-3 |  |  |  |  |  |  |  |
| B2-4 |  |  |  |  |  |  |  |
| B2-5 |  |  |  |  |  |  |  |
| Polymerization inhibitor | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 |
| Total (Percent by mass) | 100.0 | 100.0 | 100.0 | 100.0 | 100.0 | 100.0 | 100.0 |

TABLE 4

|  | Example | | | | | | |
|---|---|---|---|---|---|---|---|
|  | 29 | 30 | 31 | 32 | 33 | 34 | 35 |
| A1-1 | 93.8 | 93.8 | 93.8 |  |  |  |  |
| A1-2 |  |  |  |  |  |  |  |
| A1-3 |  |  |  |  |  |  |  |
| A1-4 |  |  |  |  |  |  |  |
| A1-5 |  |  |  |  |  |  |  |
| A1-6 |  |  |  |  |  | 93.8 | 93.8 |
| A1-7 |  |  |  |  |  |  |  |
| A1-8 |  |  |  |  |  |  |  |
| A1-9 |  |  |  |  |  |  |  |
| A1-10 |  |  |  | 93.8 |  |  |  |
| A1-11 |  |  |  |  | 93.8 |  |  |
| A2-1 |  |  |  |  |  |  |  |
| A2-2 |  |  |  |  |  |  |  |
| A2-3 |  |  |  |  |  |  |  |
| A2-4 |  |  |  |  |  |  |  |
| A2-5 |  |  |  |  |  |  |  |
| B1-1 |  |  |  |  |  |  |  |
| B1-2 | 3.0 | 3.0 | 3.0 | 3.0 | 3.0 | 3.0 | 3.0 |
| B1-3 | 3.0 | 3.0 | 3.0 | 3.0 | 3.0 | 3.0 | 3.0 |
| B1-4 |  |  |  |  |  |  |  |
| B1-5 |  |  |  |  |  |  |  |
| B1-6 |  |  |  |  |  |  |  |
| B2-1 |  |  |  |  |  |  |  |
| B2-2 |  |  |  |  |  |  |  |
| B2-3 |  |  |  |  |  |  |  |
| B2-4 |  |  |  |  |  |  |  |
| B2-5 |  |  |  |  |  |  |  |
| Polymerization inhibitor | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 |
| Total (Percent by mass) | 100.0 | 100.0 | 100.0 | 100.0 | 100.0 | 100.0 | 100.0 |

|  | Example | | | | | | |
|---|---|---|---|---|---|---|---|
|  | 36 | 37 | 38 | 39 | 40 | 41 | 42 |
| A1-1 |  |  | 73.8 | 83.8 | 73.8 | 73.8 | 73.8 |
| A1-2 |  |  |  |  |  |  |  |
| A1-3 |  |  |  |  |  |  |  |
| A1-4 |  |  |  |  |  |  |  |
| A1-5 |  |  |  |  |  |  |  |
| A1-6 |  |  |  |  |  |  |  |
| A1-7 | 93.8 |  |  |  |  |  |  |
| A1-8 |  | 93.8 |  |  |  |  |  |
| A1-9 |  |  |  |  |  |  |  |
| A1-10 |  |  |  |  |  |  |  |
| A1-11 |  |  |  |  |  |  |  |
| A2-1 |  |  |  |  |  |  | 10.0 |
| A2-2 |  |  |  |  |  |  |  |
| A2-3 |  |  | 20.0 |  | 10.0 |  | 10.0 |
| A2-4 |  |  |  | 5.0 |  | 10.0 |  |
| A2-5 |  |  |  | 5.0 | 10.0 | 10.0 |  |
| B1-1 |  |  |  |  |  |  |  |
| B1-2 | 3.0 | 3.0 | 3.0 | 3.0 | 3.0 | 3.0 | 3.0 |
| B1-3 | 3.0 | 3.0 | 3.0 | 3.0 | 3.0 | 3.0 | 3.0 |
| B1-4 |  |  |  |  |  |  |  |
| B1-5 |  |  |  |  |  |  |  |
| B1-6 |  |  |  |  |  |  |  |
| B2-1 |  |  |  |  |  |  |  |
| B2-2 |  |  |  |  |  |  |  |
| B2-3 |  |  |  |  |  |  |  |
| B2-4 |  |  |  |  |  |  |  |
| B2-5 |  |  |  |  |  |  |  |
| Polymerization inhibitor | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 |
| Total (Percent by mass) | 100.0 | 100.0 | 100.0 | 100.0 | 100.0 | 100.0 | 100.0 |

TABLE 5

|  | Example | | | | | | |
|---|---|---|---|---|---|---|---|
|  | 43 | 44 | 45 | 46 | 47 | 48 | 49 |
| A1-1 | 73.8 | 73.8 | 73.8 | 73.8 | 73.8 | 94.8 | 89.8 |
| A1-2 |  |  |  |  |  |  |  |
| A1-3 |  |  |  |  |  |  |  |
| A1-4 |  |  |  |  |  |  |  |
| A1-5 |  |  |  |  |  |  |  |
| A1-6 |  |  |  |  |  |  |  |
| A1-7 |  |  |  |  |  |  |  |
| A1-8 |  |  |  |  |  |  |  |
| A1-9 |  |  |  |  |  |  |  |

TABLE 5-continued

| | Example | | | | | | |
|---|---|---|---|---|---|---|---|
| | 50 | 51 | 52 | 53 | 54 | 55 | 56 |
| A1-1 | 89.8 | 89.8 | 73.8 | 73.8 | 73.8 | 73.8 | 73.8 |
| A1-2 | | | | | | | |
| A1-3 | | | | | | | |
| A1-10 | | | | | | | |
| A1-11 | | | | | | | |
| A2-1 | 21.0 | | 10.0 | | 21.0 | | |
| A2-2 | | | | 21.0 | | | |
| A2-3 | | 21.0 | 11.0 | | | | |
| A2-4 | | | | | | | |
| A2-5 | | | | | | | |
| B1-1 | | | | | | | |
| B1-2 | | | | | | | |
| B1-3 | | | | | | | |
| B1-4 | 5.0 | 5.0 | 5.0 | | | | |
| B1-5 | | | | 5.0 | 5.0 | 5.0 | |
| B1-6 | | | | | | | 10.0 |
| B2-1 | | | | | | | |
| B2-2 | | | | | | | |
| B2-3 | | | | | | | |
| B2-4 | | | | | | | |
| B2-5 | | | | | | | |
| Polymerization inhibitor | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 |
| Total (Percent by mass) | 100.0 | 100.0 | 100.0 | 100.0 | 100.0 | 100.0 | 100.0 |

TABLE 5-continued

| | | | | | | | |
|---|---|---|---|---|---|---|---|
| A1-4 | | | | | | | |
| A1-5 | | 10.0 | | | | | |
| A1-6 | | | 6.0 | 10.0 | | | |
| A1-7 | | | | 6.0 | 10.0 | | |
| A1-8 | | | | | 6.0 | | |
| A1-9 | | | | | | | |
| A1-10 | | | | | | 16.0 | |
| A1-11 | | | | | | | 16.0 |
| A2-1 | | | | | | | |
| A2-2 | | | | | | | |
| A2-3 | | | | | | | |
| A2-4 | | | | | | | |
| A2-5 | | | | | | | |
| B1-1 | | | | | | 5.0 | 5.0 |
| B1-2 | | | | | | | |
| B1-3 | | | | | | | |
| B1-4 | | | 5.0 | 5.0 | 5.0 | 5.0 | |
| B1-5 | | | 5.0 | 5.0 | 5.0 | | 5.0 |
| B1-6 | 10.0 | 10.0 | | | | | |
| B2-1 | | | | | | | |
| B2-2 | | | | | | | |
| B2-3 | | | | | | | |
| B2-4 | | | | | | | |
| B2-5 | | | | | | | |
| Polymerization inhibitor | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 |
| Total (Percent by mass) | 100.0 | 100.0 | 100.0 | 100.0 | 100.0 | 100.0 | 100.0 |

TABLE 6

| | Comparative Example | | | | | | | | | |
|---|---|---|---|---|---|---|---|---|---|---|
| | 1 | 2 | 3 | 4 | 5 | 6 | 7 | 8 | 9 | 10 |
| A1-1 | | | | | | 98.8 | | | | |
| A1-2 | | | | | | | | | | |
| A1-3 | | | | | | | | | | |
| A1-4 | | | | | | | | | | |
| A1-5 | | | | | | | | | | |
| A1-6 | 94.8 | 89.8 | | | 89.8 | | | | | |
| A1-7 | | | | | | | | | | |
| A1-8 | | | | | | | | | | |
| A1-9 | | | | | | | | | | |
| A1-10 | | | | | | | | | | |
| A1-11 | | | | | | | | | | |
| A2-1 | | | | | | | | | | |
| A2-2 | | | 89.8 | 89.8 | | | 95.8 | | | |
| A2-3 | | | | | | | | 95.8 | | |
| A2-4 | | | | | | | | | 95.8 | |
| A2-5 | | | | | | | | | | 95.8 |
| B1-1 | | | 10.0 | | | | | | | |
| B1-2 | | | | | | | 4.0 | | | |
| B1-3 | | | | | | | | 4.0 | | |
| B1-4 | | | | | | | | | 4.0 | |
| B1-5 | | | | | | | | | | 4.0 |
| B1-6 | | | | | | | | | | |
| B2-1 | 5.0 | 10.0 | | 10.0 | 10.0 | 1.0 | | | | |
| B2-2 | | | | | | | | | | |
| B2-3 | | | | | | | | | | |
| B2-4 | | | | | | | | | | |
| B2-5 | | | | | | | | | | |
| Polymerization inhibitor | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 |
| Total (Percent by mass) | 100.0 | 100.0 | 100.0 | 100.0 | 100.0 | 100.0 | 100.0 | 100.0 | 100.0 | 100.0 |

TABLE 7

| | Comparative Example | | | | | |
|---|---|---|---|---|---|---|
| | 11 | 12 | 13 | 14 | 15 | 16 |
| A1-1 | | | | | 95.8 | 95.8 |
| A1-2 | | | | | | |
| A1-3 | | | | | | |
| A1-4 | | | | | | |
| A1-5 | | | | | | |
| A1-6 | | | | | | |
| A1-7 | | | | | | |
| A1-8 | | | | | | |
| A1-9 | | | | | | |
| A1-10 | | | | | | |
| A1-11 | | | | | | |
| A2-1 | 95.8 | 95.8 | | | | |
| A2-2 | | | 95.8 | 95.8 | | |
| A2-3 | | | | | | |
| A2-4 | | | | | | |
| A2-5 | | | | | | |
| B1-1 | | | | | | |
| B1-2 | | | | | | |
| B1-3 | | | | | | |
| B1-4 | | | | | | |
| B1-5 | | | | | | |
| B1-6 | 4.0 | | 4.0 | | | |
| B2-1 | | | | | | |
| B2-2 | | | | | 4.0 | |
| B2-3 | | 4.0 | | | | |
| B2-4 | | | | 4.0 | | |
| B2-5 | | | | | | 4.0 |
| Polymerization inhibitor | 0.1 | 0.1 | 0.1 | 0.1 | 0.1 | 0.1 |
| Surfactant | 0.1 | 0.1 | 0.1 | 0.1 | 0.1 | 0.1 |
| Total (Percent by mass) | 100.0 | 100.0 | 100.0 | 100.0 | 100.0 | 100.0 |

Evaluation on Curability

Each active energy ray curable composition was loaded in respective plastic containers. Each of the plastic container was mounted onto an image forming device including an inkjet head (MH 5440, manufactured by Ricoh Co., Ltd.) as a discharging device, a UV-LED (LED-Zero, wavelength of 395 nm, illuminance of 1.0 W/cm$^2$ on the irradiated surface, manufactured by Integration Technology Japan) as an active energy ray irradiator, a controller for controlling discharging, and a supply path from the container to the inkjet head.

The temperature of the inkjet head was appropriately adjusted in such a manner that viscosity of the active energy ray curable composition was from 10 to 12 mPa·s. Thereafter, the active energy ray curable composition was jetted onto a PET film (Cosmo Shine A4100, thickness of 188 μm, manufactured by TOYOBO CO., LTD.) commercially available on the market was a general film material to form a film thickness of 10 μm thereon. The film was irradiated with ultraviolet rays using a UV-LED to manufacture a cured product (printed image). The film was determined as cured if the film was free of tackiness when touched. The cumulative irradiation light amount required to cure the film was calculated. The results are shown in Tables 8 to 13. The active energy ray curable composition was determined as practical when the cumulative irradiation light amount required to cure was 1.0 J/cm$^2$ or less Evaluation of Property of Wetted Surface Production of Ink Discharging Head Using Epoxy Adhesive 40.0 percent by mass bisphenol A type epoxy compound (jER 828, manufactured by Mitsubishi Chemical Corporation), 20.0 percent by mass bisphenol F type epoxy compound (jER 806, manufactured by Mitsubishi Chemical Corporation), 20.0 percent by mass p-aminophenol type epoxy compound (jER630, manufactured by Mitsubishi Chemical Corporation), and 2.0 percent by mass silica (Aerosil R972, manufactured by Nippon Aerosil Co., Ltd.) were sequentially added and stirred until the mixture was uniform. Moreover, 18.0 percent by mass amine adduct (AMICURE MY-24, manufactured by Ajinomoto Fine Techno Co., Ltd.) was added and the mixture was stirred and mixed to obtain a uniform resultant to prepare an epoxy adhesive. Using this epoxy adhesive, the member forming a liquid chamber which the active energy ray curable composition contacted, the member forming a nozzle plate, and the member forming a flow path were joined to manufacture the liquid chamber, the nozzle plate having a nozzle hole, and an ink discharging head (model MH 5440 type, manufactured by Ricoh Co., Ltd.) having the flow path.

Discharging Stability

Discharging conditions were set in such a manner that the active energy ray curable composition was discharged at 7 m/s using an image forming device in which the manufactured ink discharging head and each active energy ray curable composition were combined. After leaving the ink discharging head filled with the active energy ray curable composition for four weeks, the composition was discharged again under the set discharging conditions. Thereafter, discharging stability was evaluated based on the following evaluation criteria. The smaller the drop in the discharging speed, the better the discharging stability. That is, the active energy ray curable composition has excellent wetted surface property to the adhesive for use in the ink discharging head. The active energy ray curable composition graded A or B was determined as practically usable. The measuring results are shown in Tables 8 to 13.

Evaluation Criteria
A: Discharging speed after leaving was 6 m/s or more
B: Discharging speed after leaving was from 5 to less than 6 m/s
C: Discharging speed after leaving was less than 5 m/s or not discharged Evaluation on Skin Sensitization The Stimulation Index (SI) of each of the prepared active energy ray curable compositions was determined based on the LLNA method defined by the OECD Test Guideline 429, etc., and is also shown in Tables 8 to 13 below. B and higher grades are practically usable.

Evaluation Criteria
A: SI value less than 1.6
B: SI value from 1.6 to less than 3.0
C: SI value from 3.0 to less than 6.0
D: SI value 6.0 or more

TABLE 8

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Cumulative amount of irradiation light | 1.0 | 0.8 | 0.5 | 0.8 | 0.5 | 1.0 | 0.6 | 1.0 | 0.6 | 0.5 | 0.4 | 0.6 | 0.6 | 0.9 |

TABLE 8-continued

| | Example | | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| required for curing (J/cm$^2$) | | | | | | | | | | | | | | |
| Discharging stability | A | A | A | A | A | A | A | A | A | A | B | A | B | A |
| Skin sensitization | A | A | A | A | A | A | A | A | A | A | A | A | A | A |

TABLE 9

| | Example | | | | | | | | | | | | | |
|---|---|---|---|---|---|---|---|---|---|---|---|---|---|
| | 15 | 16 | 17 | 18 | 19 | 20 | 21 | 22 | 23 | 24 | 25 | 26 | 27 | 28 |
| Cumulative amount of irradiation light required for curing (J/cm$^2$) | 0.5 | 0.6 | 0.6 | 0.5 | 0.4 | 0.5 | 0.6 | 0.7 | 0.5 | 0.5 | 0.5 | 0.6 | 0.5 | 0.5 |
| Discharging stability | B | A | A | B | A | A | A | A | B | A | B | B | B | A |
| Skin sensitization | A | A | A | A | A | A | A | A | A | A | A | A | A | A |

TABLE 10

| | Example | | | | | | | | | | | | | |
|---|---|---|---|---|---|---|---|---|---|---|---|---|---|
| | 29 | 30 | 31 | 32 | 33 | 34 | 35 | 36 | 37 | 38 | 39 | 40 | 41 | 42 |
| Cumulative amount of irradiation light required for curing (J/cm$^2$) | 0.4 | 0.4 | 0.4 | 0.4 | 0.3 | 0.5 | 0.4 | 0.6 | 0.5 | 0.8 | 1.0 | 1.0 | 0.9 | 0.7 |
| Discharging stability | B | B | A | B | B | B | B | A | A | A | A | A | A | A |
| Skin sensitization | A | A | A | A | A | A | A | A | A | A | A | A | A | A |

TABLE 11

| | Example | | | | | | | | | | | | | |
|---|---|---|---|---|---|---|---|---|---|---|---|---|---|
| | 43 | 44 | 45 | 46 | 47 | 48 | 49 | 50 | 51 | 52 | 53 | 54 | 55 | 56 |
| Cumulative amount of irradiation light required for curing (J/cm$^2$) | 0.9 | 0.9 | 0.8 | 1.0 | 0.9 | 1.0 | 0.7 | 1.0 | 0.8 | 1.0 | 1.0 | 0.8 | 0.9 | 0.9 |
| Discharging stability | A | A | A | A | B | A | A | A | A | A | A | A | B | B |
| Skin sensitization | A | A | A | A | A | A | A | A | A | A | A | A | A | A |

TABLE 12

|  | Comparative Example | | | | | | | | | |
|---|---|---|---|---|---|---|---|---|---|---|
|  | 1 | 2 | 3 | 4 | 5 | 6 | 7 | 8 | 9 | 10 |
| Cumulative amount of irradiation light required for curing (J/cm$^2$) | *1 | *2 | 0.5 | 0.5 | *1 | *2 | 0.6 | *1 | *1 | 0.5 |
| Discharging stability | A | A | C | C | A | A | C | B | B | C |
| Skin sensitization | D | D | D | D | D | D | C | C | C | D |

* "* 1" in Table 12 means that the active ray curable composition was not cured when the cumulative amount of irradiation light reached 100 J/cm$^2$. Also, "* 2" means that the polymerization initiator was not be completely dissolved in the active energy ray curable composition so that the composition was not evaluated.

TABLE 13

|  | Comparative Example | | | | | |
|---|---|---|---|---|---|---|
|  | 11 | 12 | 13 | 14 | 15 | 16 |
| Cumulative amount of irradiation light required for curing (J/cm$^2$) | 0.5 | 1.5 | 0.6 | 2.0 | 0.6 | 0.5 |
| Discharging stability | C | C | C | C | C | C |
| Skin sensitization | D | D | D | D | D | D |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A composition comprising:
    an acrylamide compound A1 having an ester structure and a polymerization initiator B1 having a molecular weight of 800 or more.

2. The composition according to claim 1, wherein the polymerization initiator B1 comprises at least one member selected from the group consisting of a polymerization initiator represented by the following formula 1, 1,3-di({α-[1-chloro-9-oxo-9H-thioxanthene-4-yl)oxy]acetylpoly[oxy(1-methylethylene)]}oxy)-2,2-bis({α-[1-chloro-9-oxo-9H-thioxanthen-4-yl)oxy]acetyl poly[oxy (1-methylethylene)]}oxymethyl)propane, a mixture of 1,3-di({α-4-(dimethylamino)benzoylpoly[oxy(1-methylethylene)]}oxy)-2,2-bis({α-4-(dimethylamino)benzoylpoly[oxy(1-methylethylene)]}oxymethyl)propane and {α-4-(dimethylamino)benzoylpoly(oxyethylene)-poly[oxy(1-methylethylene)]-poly(oxyethylene)}4-(dimethylamino)benzoate, polybutylene glycol bis(9-oxo-9H-thioxanthinyloxy)acetate, and an oligomer of 2-hydroxy-1-(4-isopropenylphenyl)-2-methylpropan-1-one, formula 1

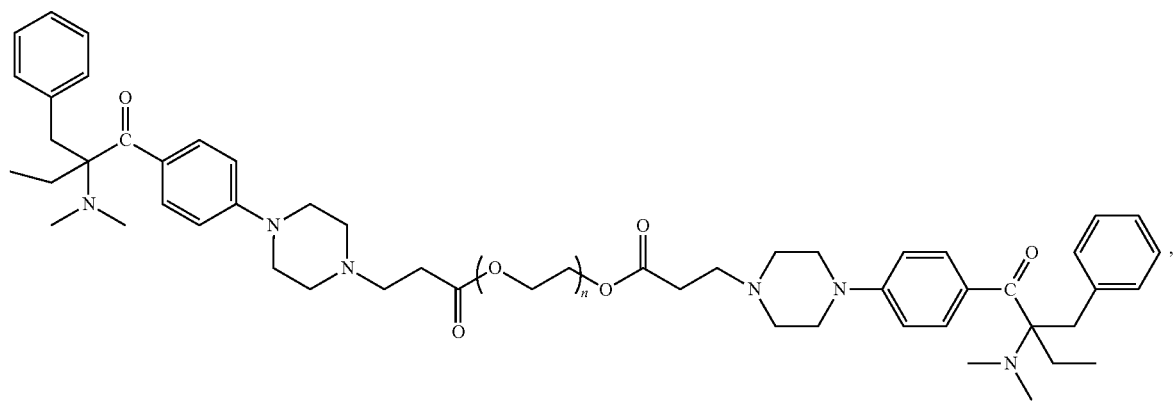

wherein n is an integer of from 1 to 9.

3. The composition according to claim 1, wherein the acrylamide compound A1 has a molecular weight of from 150 to 250.

4. The composition according to claim 1, wherein the acrylamide compound A1 has a molecular weight of from 150 to 200.

5. The composition according to claim 1, wherein the ester structure comprises an alkyl ester group comprising a linear or branched chain having 1 to 4 carbon atoms.

6. The composition according to claim 1, wherein the acrylamide compound A1 is represented by at least one formula selected from the group consisting of the following formula 2 and formula 3:

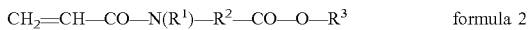
$$CH_2=CH-CO-N(R^1)-R^2-CO-O-R^3 \quad \text{formula 2}$$

wherein $R^1$ represents a hydrogen atom or a linear or branched alkyl group having 1 to 4 carbon atoms, $R^2$ represents a linear or branched alkylene group having 1 to 4 carbon atoms, and $R^3$ represents a linear or branched alkyl group having 1 to 4 carbon atoms, wherein a number of the carbon atoms of $R^1$, $R^2$, and $R^3$ is from 2 to 6 in total, formula 3

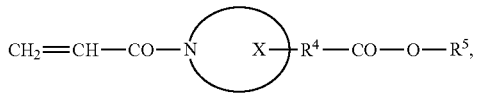

wherein a ring X represents a ring structure having 2 to 5 carbon atoms including a nitrogen atom, $R^4$ represents a single bond or a linear or branched alkylene group having 1 to 3 carbon atoms, $R^5$ represents a linear or branched alkyl group having 1 to 3 carbon atoms, wherein a number of the carbon atoms of the ring X, $R^4$, and $R^5$ is from 3 to 6 in total.

7. The composition according to claim 6, wherein the acrylamide compound A1 is represented by the formula 2 and $R^3$ represents an alkyl group having 1 or 2 carbon atoms.

8. The composition according to claim 1, wherein a mass ratio of a content of the acrylamide compound A1 to a content of the polymerization initiator B1 is from 9.0 to 19.0.

9. The composition according to claim 1 being free of an organic solvent.

10. The composition according to claim 1 being an active energy ray curable composition.

11. An accommodating unit comprising:
the composition of claim 1; and
a container accommodating the composition.

12. An image forming device comprising:
the accommodating unit of claim 11;
a discharging device configured to discharge the composition accommodated in the accommodating unit to a recording medium, the discharging device comprising a liquid chamber, a nozzle plate including a nozzle orifice through which the composition is discharged, and a flow path; and
an irradiator configured to irradiate the composition discharged onto the recording medium by the discharging device with active energy rays,
wherein at least one of members constituting the liquid chamber, members constituting the nozzle plate, and members constituting the flow path is attached at one or more portions with an adhesive.

13. The image forming device according to claim 12, wherein the adhesive comprises an epoxy adhesive.

14. The image forming device according to claim 12, wherein the irradiator comprises a UV-LED, which emits ultraviolet rays having a light emission wavelength in a range of from 365 to 405 nm.

15. An image forming method comprising:
discharging the composition of claim 1 to a recording medium by a discharging device; and
irradiating the composition discharged onto the recording medium with active energy rays to cure the composition,
wherein the discharging device comprises a liquid chamber, a nozzle plate including a nozzle orifice through which the composition is discharged, and a flow path,
wherein at least one of members constituting the liquid chamber, members constituting the nozzle plate, and members constituting the flow path is attached at one or more portions with an adhesive.

* * * * *